(12) United States Patent
Yang

(10) Patent No.: US 7,227,530 B1
(45) Date of Patent: Jun. 5, 2007

(54) ASSEMBLY OF INDEPENDENT MOUSE OR TRACK BALL DEVICE USING KEYBOARD AS AN OPERATIONAL RELAY WITH KEYBOARD

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 565 days.

(21) Appl. No.: 09/628,428

(22) Filed: Jul. 28, 2000

(51) Int. Cl.
*G09G 5/08* (2006.01)

(52) U.S. Cl. ............... 345/158; 345/168; 345/161; 345/175; 359/1

(58) Field of Classification Search ........... 345/168, 345/161, 163, 165, 166, 167, 158, 175, 177, 345/156; 359/1
See application file for complete search history.

(56) References Cited

U.S. PATENT DOCUMENTS 5,189,543 A * 2/1993 Lin et al. .................... 359/1
5,585,823 A * 12/1996 Duchon et al. ............. 345/163
5,706,031 A * 1/1998 Brendzel et al. ........... 345/172
5,737,107 A * 4/1998 Umeda ........................ 359/1
5,861,822 A * 1/1999 Park et al. .................. 341/22
5,920,306 A * 7/1999 Kikinis ...................... 345/158
5,943,506 A * 8/1999 Poisner ...................... 395/868
6,079,676 A * 6/2000 Hackett et al. ............ 248/118
6,169,789 B1 * 1/2001 Rao et al. ............. 379/110.01
6,304,250 B1 * 10/2001 Yang et al. ................. 345/168
6,359,610 B1 * 3/2002 Shah et al. ................. 345/156
6,373,468 B1 * 4/2002 Leman ....................... 345/163
6,390,432 B1 * 5/2002 Vanderheide et al. .. 248/346.01
6,504,529 B1 * 1/2003 Inagaki et al. ............ 345/168

FOREIGN PATENT DOCUMENTS

JP      11296301 A  * 10/1999

* cited by examiner

*Primary Examiner*—Albert Decady
*Assistant Examiner*—Fritz Alphonse
(74) *Attorney, Agent, or Firm*—Bacon & Thomas, PLLC

(57) ABSTRACT

An independent mouse or trackball device assembly uses a keyboard as an operational relay providing for the wired or wireless coupling of the mouse or trackball device to the keyboard assembly.

37 Claims, 26 Drawing Sheets

ASSEMBLY OF INDEPENDENT MOUSE OR TRACK BALL DEVICE USING KEYBOARD AS AN OPERATIONAL RELAY WITH KEYBOARD

BACKGROUND OF THE INVENTION (a) Field of the Invention

This invention relates to an integrated computer system input made up of an independent mouse or trackball device and a keyboard, the keyboard serving as an operational relay for the mouse or trackball device to provide a rational, clean desktop layout. The mouse or trackball device may be a conventional electro-mechanical, optical, inductive, piezo-electric, capacitive, or static device, with or without a ball.

(b) Description of the Prior Art

Keyboard, mouse, or trackball devices have long provided a convenient interface for the input of computerized data. Conventionally, coupling of the main computer with a keyboard, mouse, or trackball is made through a wired or wireless coupling. A wired coupling is usually in the form of an independent lead or cable extending from the keyboard, mouse, or trackball to the main unit, or alternatively in the form of a common construction integrating the main with the keyboard, the mouse, or the trackball. A wireless transmission coupling conventionally involves an independently built or common utility receiver, incorporated internally to provide cursor operation, scroll, or key-in capability. A disadvantage of the conventional wired coupling construction in which a main unit is associated with a keyboard, mouse, or the trackball, is that due to wire multiplicity and prolonged wire distance, what will happen easily and often is that wires get tangled with each other or kinked. In the case of wireless coupling, disadvantages include higher cost and component to component interaction that gives rise to interference.

SUMMARY OF THE INVENTION

The primary object of the invention, therefore, is to provide a compound system or assembly including an independent mouse or trackball device that uses a keyboard as an operational relay. The keyboard is connected by a wired or wireless coupling to the mouse or trackball device, and by a wired cable shared by or parallel with the keyboard cable to minimize lead quantity and/or length, and reduce clutter on the desktop or kinks in the cables, and to prevent component to component shielding or interference, so that the operational layout on the desktop may look clean, neat and wholesome as a whole.

A further object of the invention is to provide a compound system of assembly for an independent mouse or trackball device using a keyboard as an operational relay, in which coupling to the mouse or trackball device is executed by a variety of alternatives including: direct coupling by means of electrically conductive leads, or optical guide means, wired coupling by means of a conductive plug/socket union, wireless coupling through infrared, R.F. or ultrasonic transmission; or floating coupling in the form of mechanical friction rolling displacement or sensitized displacement with respect to the keyboard.

DETAILED DESCRIPTION OF THE PREFERRED EMBODIMENTS

Figure 1:
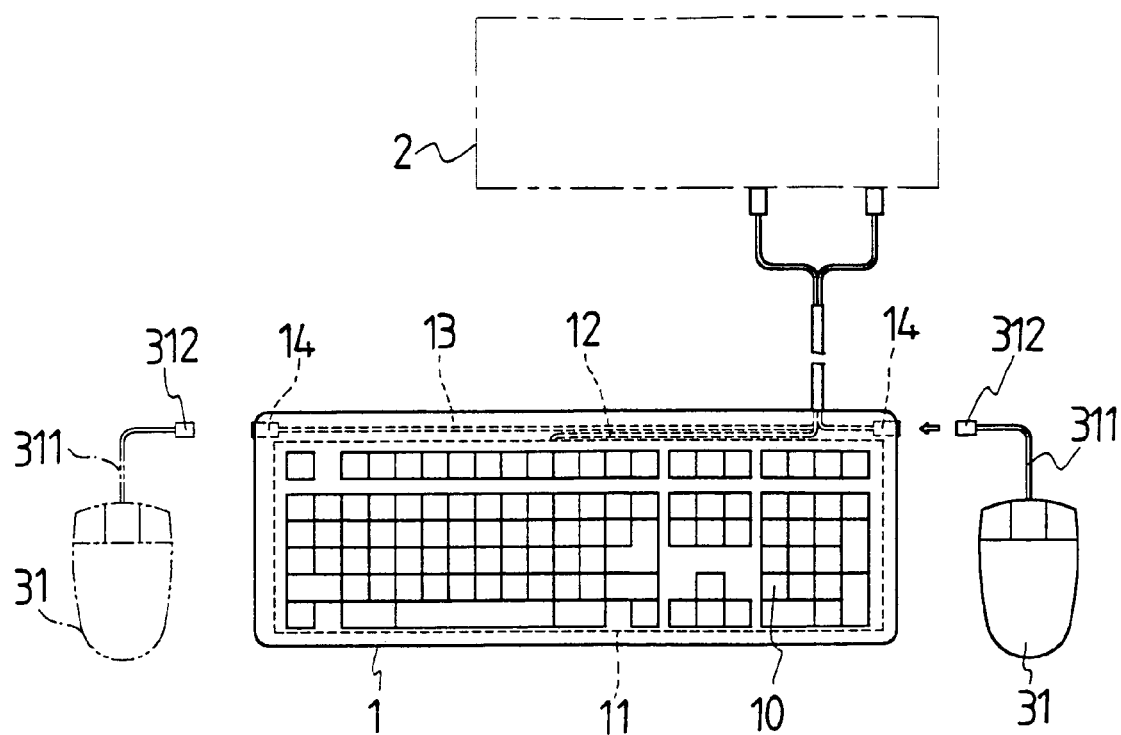
FIG. 1 is an illustration of a wired coupling embodiment of the invention with coupling sockets installed on either side of the relay keyboard.

The invention is an independent wired or wireless mouse or trackball device that uses a keyboard as an operational relay, the keyboard serving to couple the mouse or trackball device to a main unit and to control transmission between the main unit and the mouse or trackball device.

In FIG. 1 through FIG. 4 illustrate a wired coupling mode of and independent mouse or trackball device that uses a keyboard as an operational relay according to the principles of the invention. Relay keyboard 1 includes pushkeys 10 featuring selection capability, and an interior pushkey circuit 11 for each pushkey 10, the pushkey circuits 11 being linked by way of keyboard transmission cable 12 to the main unit 2.

Figure 2:
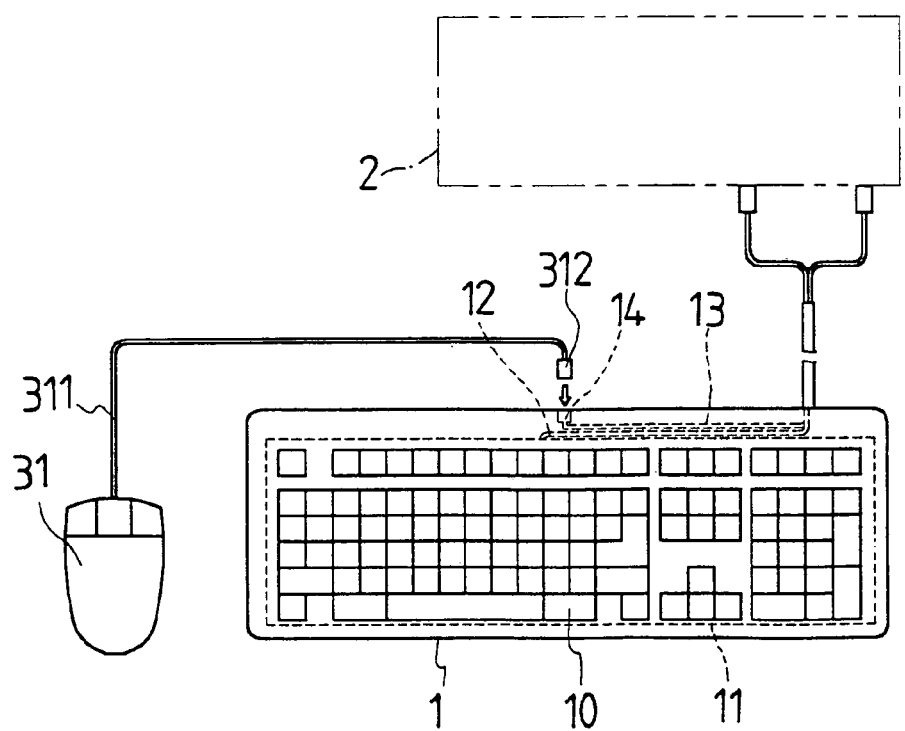
FIG. 2 is an illustration of a wired coupling embodiment of the invention with a coupling socket installed centrally in the relay keyboard.
Figure 3:
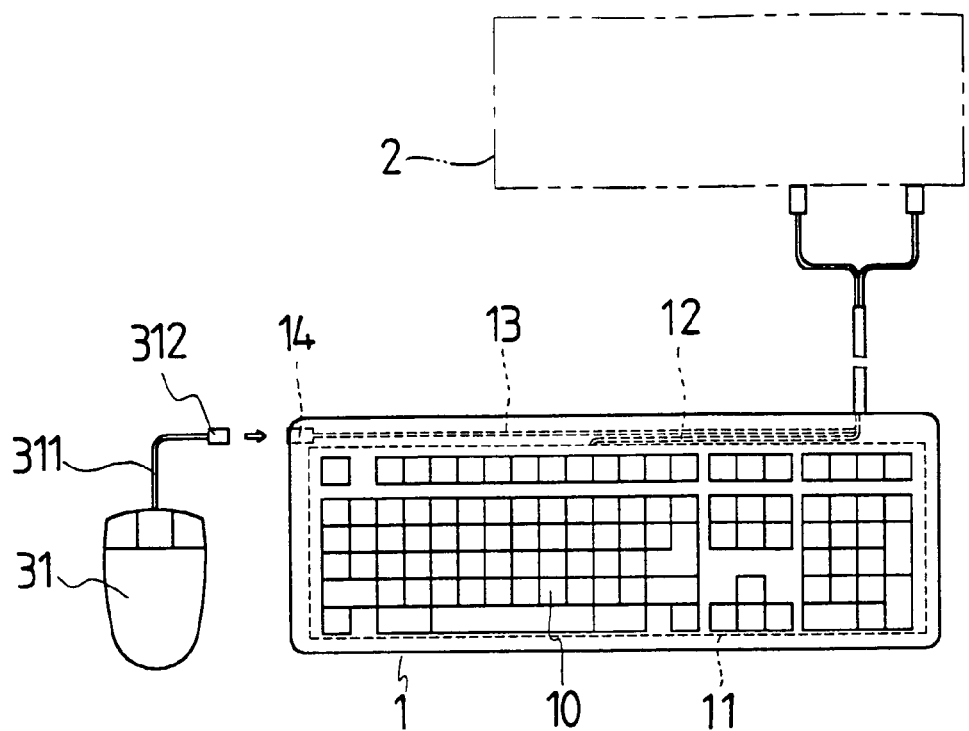
FIG. 3 is an illustration of a wired coupling embodiment of the invention with a coupling socket installed on the left side of the relay keyboard.
Figure 4:
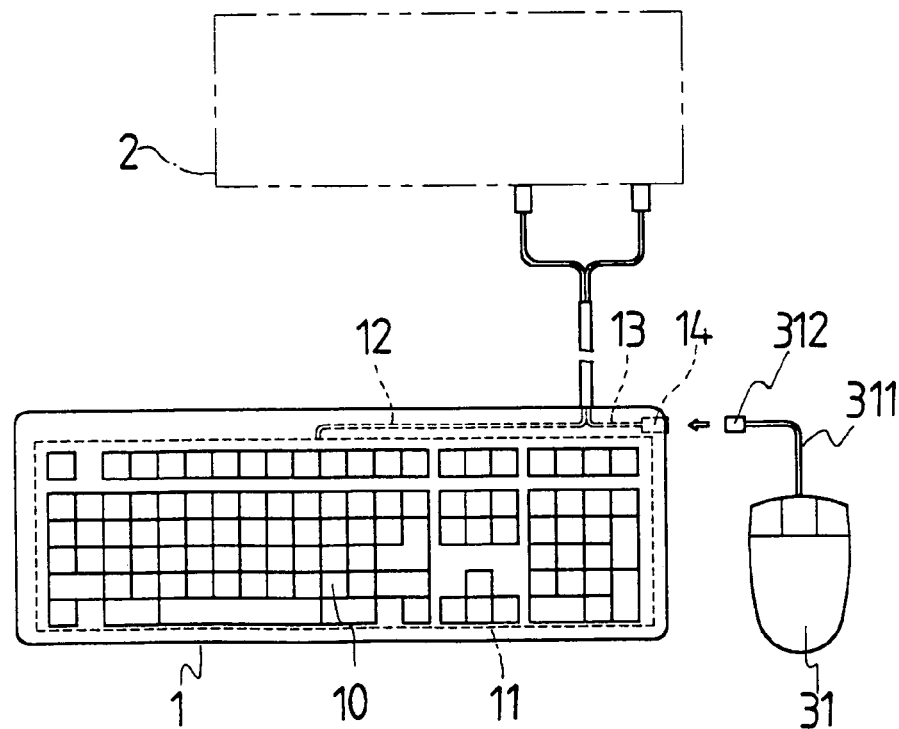
FIG. 4 is an illustration of a wired coupling embodiment of the invention with a coupling socket installed on the right side of the relay keyboard.

Relay lead 13 is mounted at a chosen position inside the relay keyboard 1, and linked to main unit 2 by a lead that extends in parallel with keyboard transmission cable 12, or alternatively coaxially in a multiple core cable, either directly alternative or by means of socket and plug sets. Relay lead 13 is connected to mouse 31 by means of a similar or dissimilar type of conventional PS2, USB, serial, or special purpose interfacing socket 14, in parallel or through coupling interfaces on both sides of the relay keyboard 1, as shown in FIG. 1, at a chosen central location, as shown in FIG. 2, on the left side (per FIG. 3), or on the right side (per FIG. 4), as dictated by the specific requirement of the user with regard to the desired location of the mouse or trackball means. The wired mouse or trackball means 31 has one end of its transmission leader 311 furnished with a plug 312 capable of coupling with aforementioned coupling socket 14.

Structured accordingly, it is possible to insert the plug 312 of the independently equipped wired mouse or trackball device 31 selectively into the coupling socket 14 to which relay lead 13 is associated, thus achieving reduction in lead quantity or a reduction in the total length of transmission lead 311 associated with the wired mouse or trackball device 31, resulting in elimination of a mess on the desktop due to lead multiplicity.

In the subject assembly, the wired coupling between the mouse or trackball device and the relay keyboard is either by means of direct coupling using an electrical or fiber optic lead, or alternatively through wired coupling by means of a conductive plug and socket assembly. However, the subject assembly may also use a wireless infrared coupling, as illustrated in FIGS. 5–10.

In the wireless coupling embodiments of FIGS. 5–10, relay keyboard 1 again incorporates pushkeys 10 featuring selection capability, and an interior pushkey circuit 11 for each pushkey 10, the pushkey circuit 11 being linked by way of keyboard transmission cable 12 to the main unit 2/

Relay lead 13 is mounted at a chosen location inside the relay keyboard 1, such that one end is connected to the infrared receiver R1 and the other end, in the form of a row in parallel with the keyboard transmission wire or cable 12 or alternatively in common with a plural core cable, is extended to be connected directly to, or by the intervention of a socket/plug assembly, to the main unit 2. Receiver R1 is equipped with a conductor means 15 to form one or more sets of infrared sensor S1 installed on one or more sides of the relay keyboard 1. The sets of infrared sensor S1 are available for parallel operation or equipped with a switching means to effect selective operations.

Figure 5:
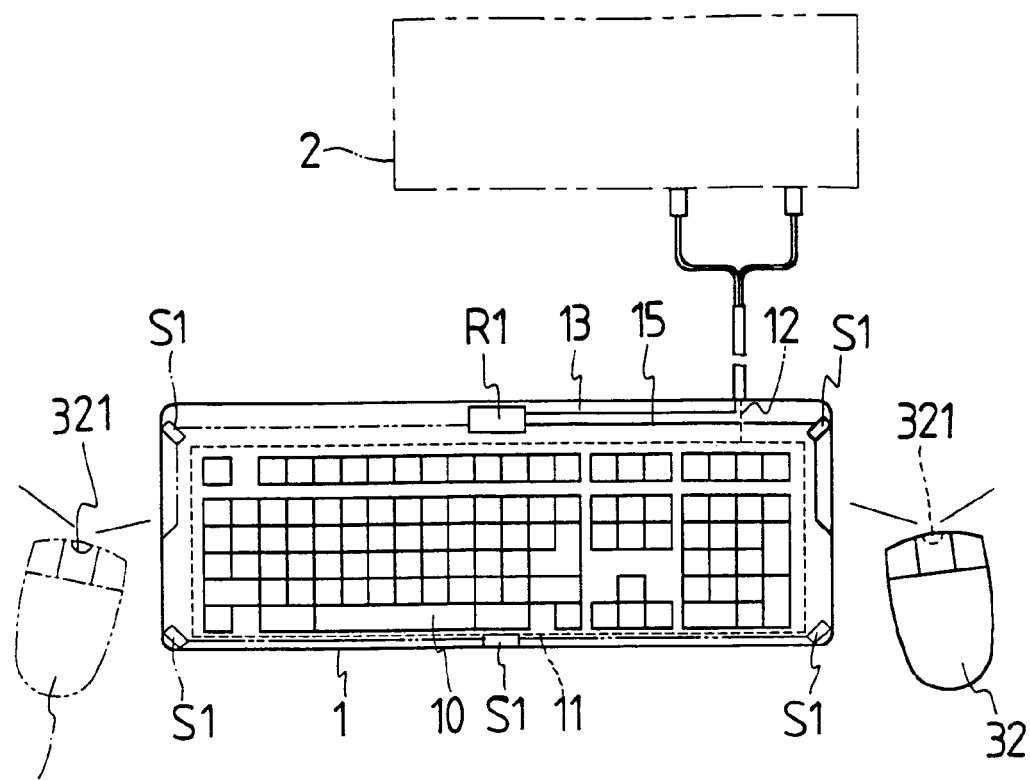
FIG. 5 is an illustration of a wireless execution where infrared is employed for coupling purposes with one set of infrared detectors installed on either side of the relay keyboard, pursuant to the invention.
Figure 6:
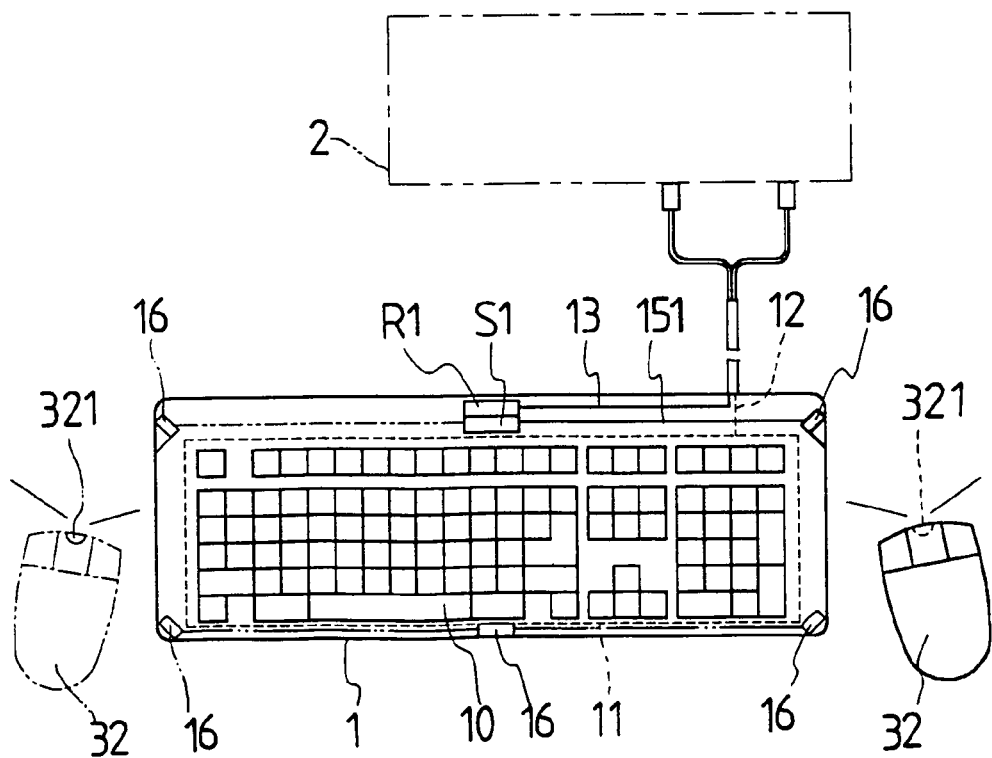
FIG. 6 illustrates an embodiment where one or more sets of light hoods serving as light guides are installed on one or both sides of the relay keyboard, for coupling to an infrared detector in relation to the receiving unit.
Figure 7:
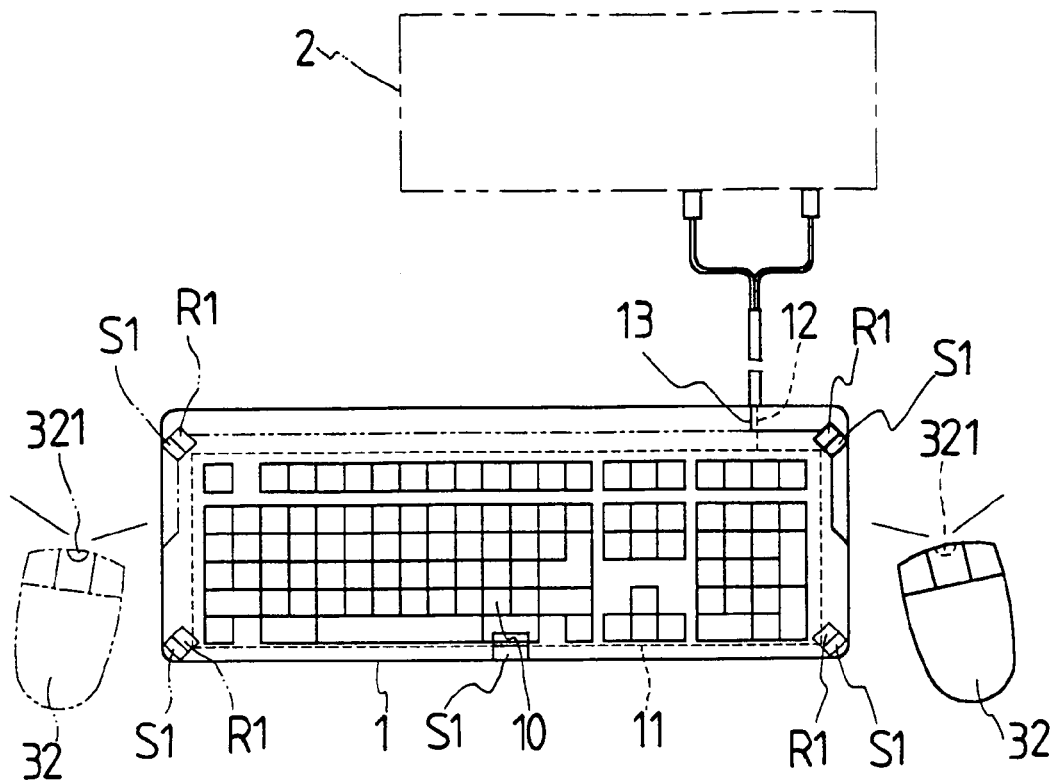
FIG. 7 is an illustration of the execution in which two sets of infrared receiver circuit devices and infrared detectors are concurrently installed on both sides of the relay keyboard.
Figure 8:
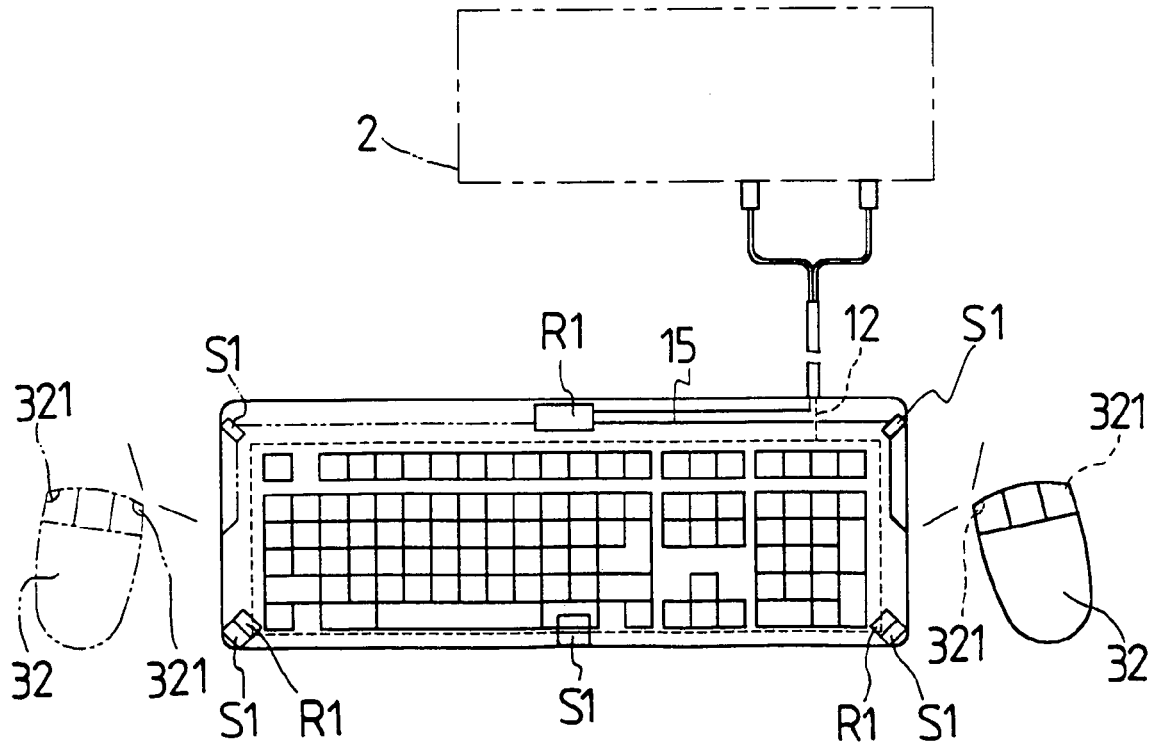
FIG. 8 illustrates an instance where one set of infrared receiver circuit devices is equipped with one set or two sets of infrared detectors, pursuant to the invention.

FIG. 5 shows and implementation that includes one set of infrared sensor S1 furnished on either side of the relay keyboard 1. The infrared sensor S1 may be optionally concealed or exposed by a wall of the relay keyboard 1, and is oriented at a suitable angle to facilitate coupling to the signal that is being emitted from or received by the infrared wireless mouse or trackball device 32 to be described further hereinafter. As illustrated in FIG. 6, one or more sets of photo guide hood 16 are furnished on one or more side of the relay keyboard 1 and interconnected, by means of a light guide means 151 which is made of light guide materials such as photo fibre or luminescent board in the form of a slit or other geometric form, to a corresponding infrared sensor S1 in the receiver R1, one set which, together with one set of infrared sensor S1, and the guide hood 16 are furnished on one or more sides of the relay keyboard 1 to facilitate infrared, wireless coupling with the infrared wireless mouse or trackball device 32. FIG. 7 shows a structure comprising two or more sets of infrared receivers R1 and infrared sensors S1 concurrently furnished on two or more sides of the relay keyboard R1 and designed to run in parallel or selectively by the intervention of switch. In the illustration given in FIG. 8, at least one set of common infrared receiver R1 and a higher number of infrared sensors S1 are attached to two or more sides, at chosen angular settings, of the relay keyboard 1, and may be run to operate in parallel, or through a selective switch to operate in common, with the infrared receiver R1.

Figure 9:
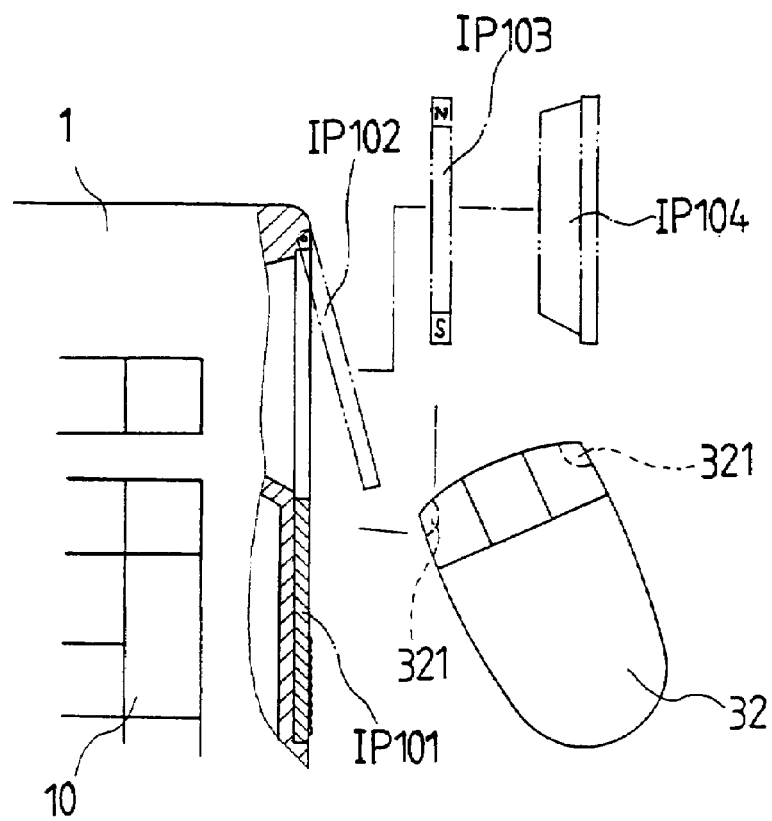
FIG. 9 illustrates an embodiment in which the relay keyboard casing is coupled with a push-pull type infrared blocking board, a snap-on type infrared blocking board, a solenoidal suction type infrared blocking board, or a closable infrared blocking board to effect selective isolation with respect to chosen windows in view of operational circumstances.
Figure 10:
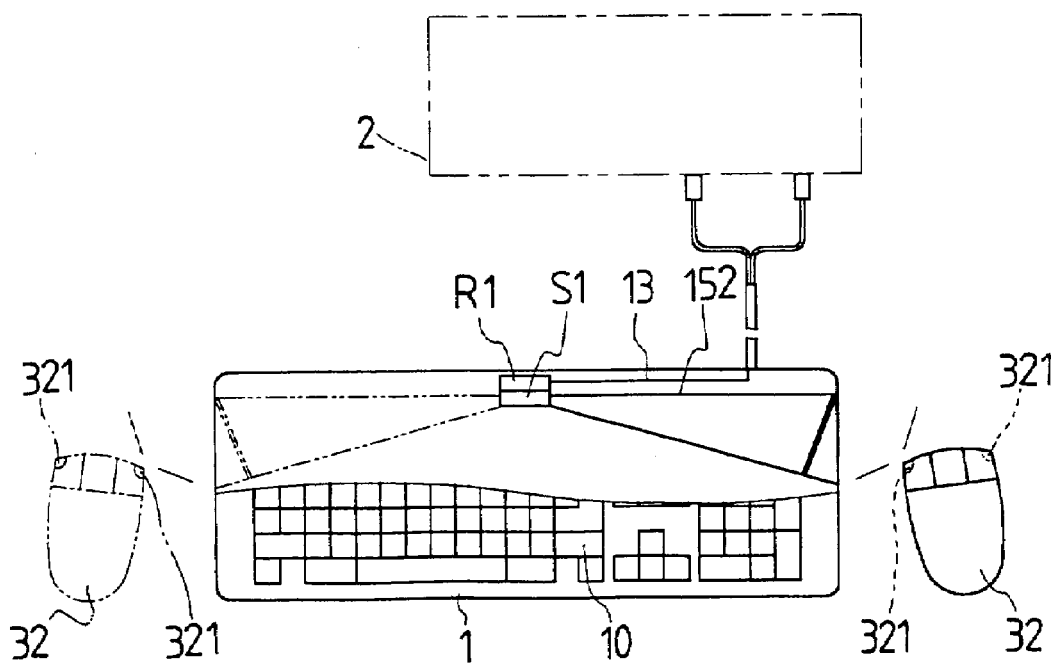
FIG. 10 illustrates an embodiment in which a signal receiving/transmission channel incorporating reflectors on the inner wall thereof is provided on one or more sides of the relay keyboard for coupling with the infrared sensor unit which forms part of the infrared receiving circuit device.

As illustrated in FIG. 9, the photo guide hood 16 of FIGS. 5–8 may be situated on a chosen side of the relay keyboard 1 a chosen angular setting which can, where needed, be adapted to yield a terminal side serving the purpose of a focusing lens, and laid in a recess further beyond lateral sides of the casing in an effort to reduce interference. The infrared access port of the casing may be coupled to a push-pull type infrared blocking board IP101, snap-on type infrared blocking board IP102, solenoidal suction type infrared blocking board IP103, or closable infrared blocking plug IP104, which serve equally to selectively isolate a portion of the access ports in operational environments, to minimize interference. As illustrated in FIG. 10, it is feasible to have an infrared signal access channel 152 of which the inner wall exhibits deflection capabilities as provided on a chosen one or more sides of the relay keyboard R1, in which directly couples the infrared sensor S1 to the infrared receiver R1 so that a signal emitted from the transmitter 321 of the infrared wireless mouse or trackball device may be transmitted straight to infrared signal access channel 152, so that by way of the afore-mentioned deflector, wireless coupling is made to the infrared sensor S1 and the receiver R1. Such an infrared signal access channel 152 is available in the form of a casing in which the inner wall is vacuum plated into a reflector surface or finished with reflective or other paint, alternatively prepared by bonding onto or sleeving into reflective metal pieces, or prepared by any means capable of accommodating infrared reflections. The infrared signal access channel 152 may have its port processed into a trumpet form to a set receiving orientation, so as to minimize interference. In addition, it is feasible to have the access port of the infrared signal access channel 152 provided with a push-pull type infrared blocking board IP101, snap-on type infrared blocking board IP102, or solenoidal suction type infrared blocking board IP103, or closable infrared blocking plug IP104, each capable of being coupled to the casing and similar to the one shown in FIG. 9 to effect selective partial blocking of the access port so that interference is minimized.

Independently installed infrared wireless mouse or trackball device 32 includes an infrared emitter 321. The infrared emission elements 321' consist straight of LEDs and similar elements, and may further incorporate one or more photo guide means 151 on the casing of the infrared wireless mouse or trackball device 32 as shown in FIG. 6, to provide two or more infrared emission orientations. Alternatively, as shown in FIG. 10, one or more infrared signal access channels 162 may be additionally incorporated onto the casing of the infrared wireless mouse or trackball device 32, to realize two or more infrared emission orientations. The access port can be any of a push-pull type infrared blocking board IP101, snap-on infrared blocking board IP102, solenoidal suction infrared blocking board IP103, or closable infrared blocking plug IP104 meant for coupling with the casing, like the one shown in FIG. 9, to effect partial obstruction of the access port where justified in view of operational environments with a view to minimize interference.

Figure 11:
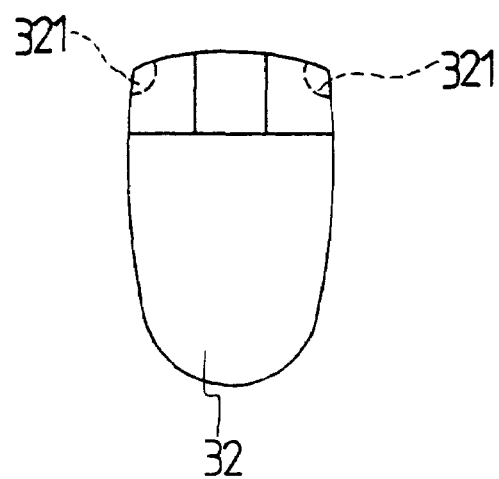
FIG. 11 illustrates an embodiment in which two sets of infrared emission circuit device are respectively installed at chosen angular settings on a infrared wireless mouse or trackball device.
Figure 36:
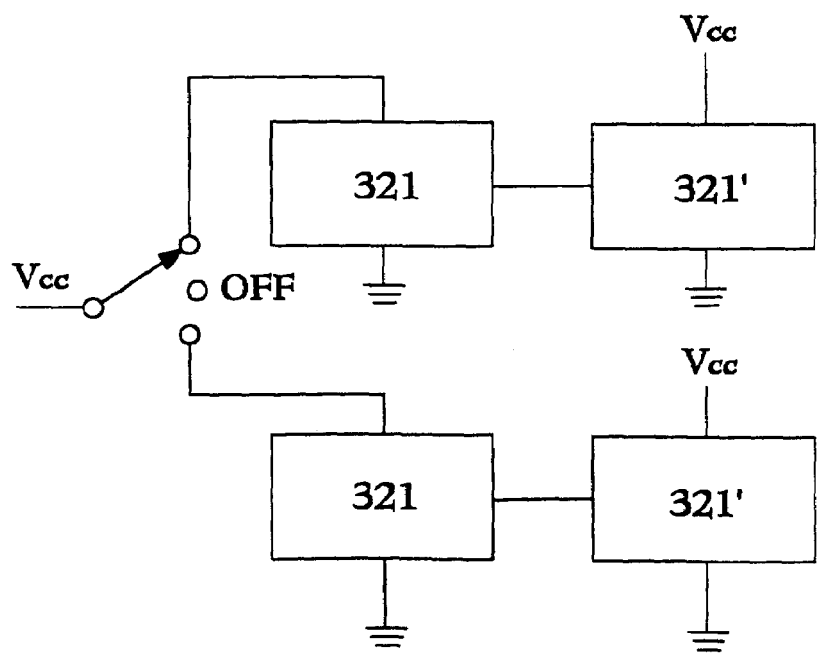
FIG. 36 illustrates a switchable infrared emission circuit device linked to an infrared wireless mouse or is track ball device.
Figure 37:
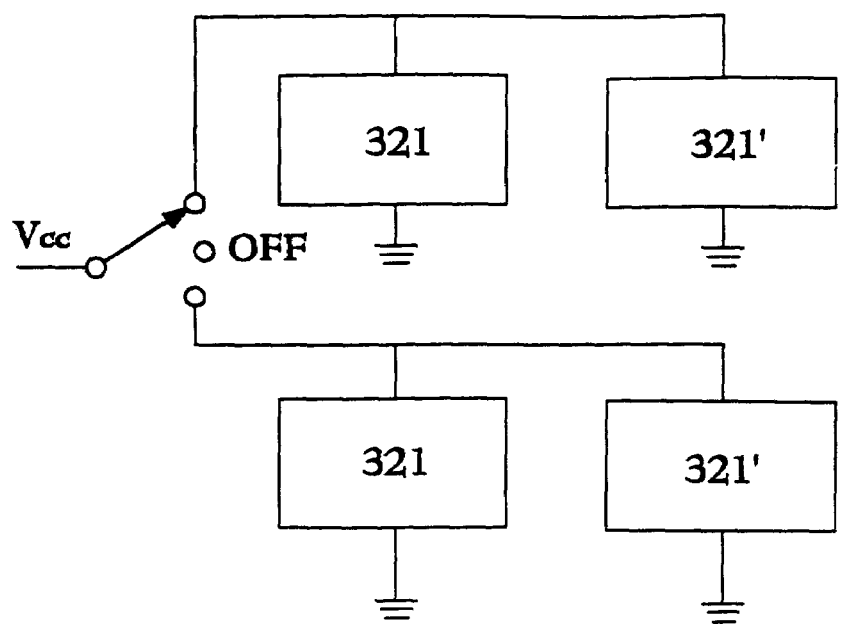
FIG. 37 illustrates an infrared emission circuit device having a dual switching mode of operation.

It is also practicable to install, at a chosen angular setting, two or more sets of infrared emission elements 321' onto the infrared mouse or trackball device, as shown in FIG. 11, sharing a same set of infrared emitter 321, or alternatively to install one set or more sets of a combination of infrared emission elements 321' and infrared emitter 321, with the infrared emission elements being available for parallel operation where needed or selective operation by the intervention of a switch to be provided for the purpose. Also, the infrared emission elements 321' may be switched as illustrated in FIG. 36, for selective operation or set for parallel operation; or as also shown in FIG. 36, a switchable infrared emission circuit 321 may be used. As shown in FIG. 37, a switch may be added to facilitate remote control electively, on the right side, or on the left side.

Structured accordingly, it is possible to transmit a signal from the infrared emission circuit 321 in relation to the independently installed infrared wireless mouse or trackball device 32 to any of aforementioned infrared sensors S1 for interception of a transmitted signal and transfer to receiver R1, thus completing a wireless coupling whereby keyboard 1 serves as an operational relay, clear and free of component-to-component shielding and interference, so that its distribution layout may help to provide a clean and neat desktop environment.

Other embodiments of the invention utilizing ultrasound wireless coupling are illustrated in FIGS. 12–18. As shown therein, relay keyboard 1 includes exterior functional pushkeys 10, and an interior pushkey circuit corresponding to each pushkey 10. The pushkey circuit 11 are further linked to the main unit 2 by a keyboard transmission lead 12.

Figure 12:
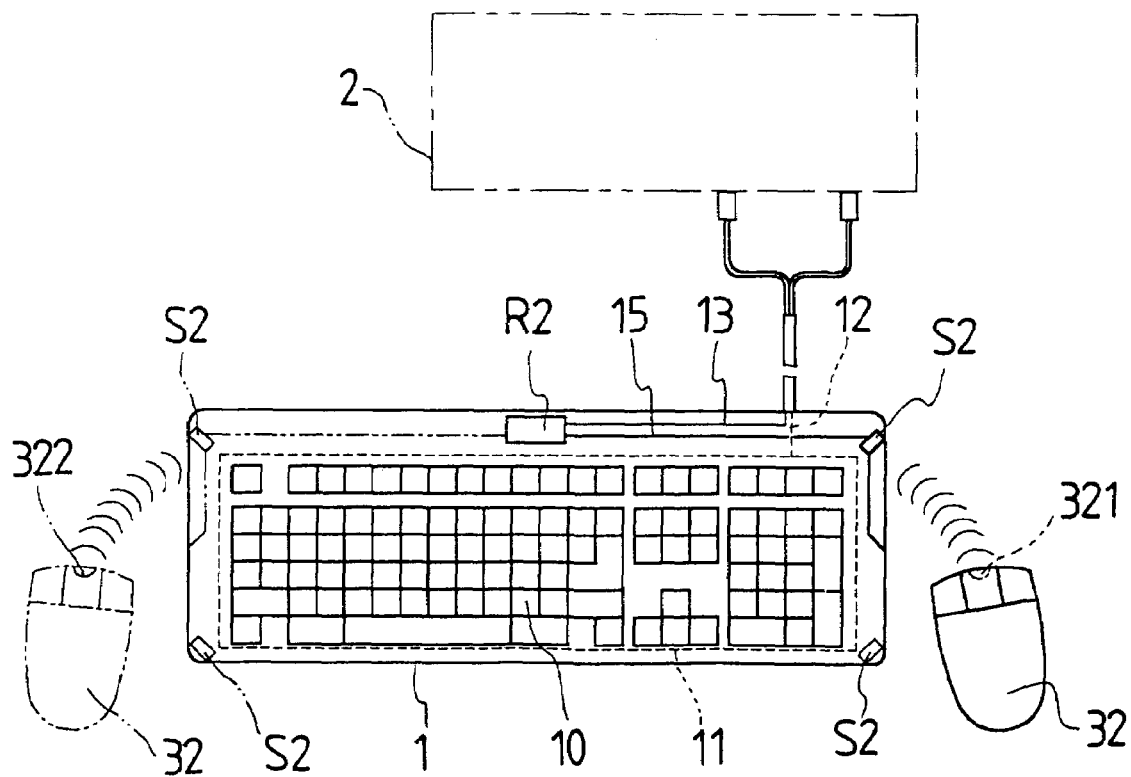
FIG. 12 illustrates an embodiment in which one set of ultrasonic sensor is installed on either side of the relay keyboard.

Relay lead 13 is furnished at a chosen location inside the keyboard 1, with one end connected to the ultrasonic receiver R2, and the other end extends parallel with keyboard transmission wire 12, or in common with a multiple core cable, for direct connection with, or by way of a socket/plug assembly to, main unit 2. Receiver R2 is furnished with conductor means 15 to form one or more sets of ultrasonic sensors S2 provided on one or more side of the relay keyboard 1. The ultrasonic sensors S2 are arranged for parallel operation where such is needed, or for selective operation by the intervention of a switch. FIG. 12 shows an example of the invention in which one set of ultrasonic sensors S2 is installed on either side of the relay keyboard 1. The ultrasonic sensor(s) S2 are either concealed or exposed in a chosen edgewise wall of the relay keyboard 1, and where justified, positioned at a suitable angle to facilitate emission or reception of a signal to or from an ultrasonic wireless mouse or trackball device 32 to be described hereinafter.

Figure 13:
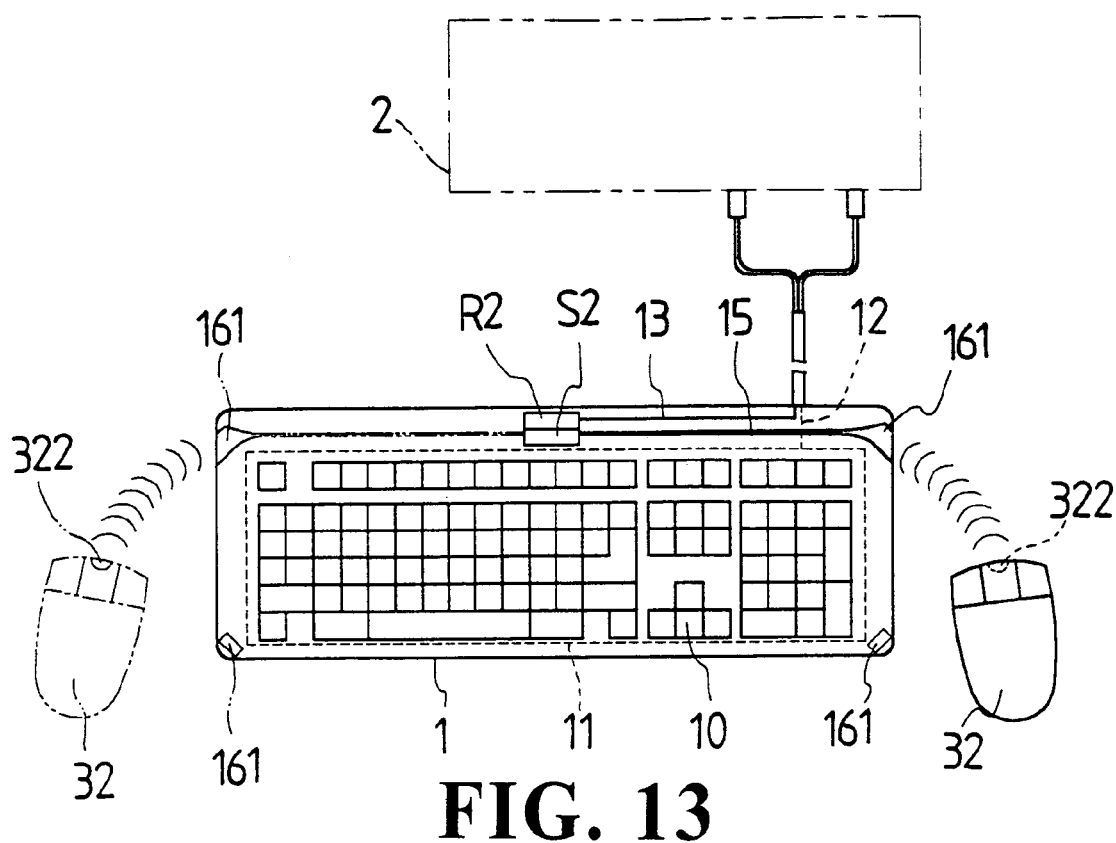
FIG. 13 illustrates an embodiment in which one or both sides of the relay keyboard is integrated with one or more sets of sound guide devices capable of sound wave transmission for coupling with corresponding ultrasonic sensors of a receiving device.

As shown in FIG. 13, a sound guide means 161 made up of one set or more set of sound wave transmitting materials, in slit form or other geometric configuration is furnished on one or more sides of the relay keyboard 1, for coupling to a ultrasonic sensor S2 corresponding to the receiver R2. In this instance, the embodiment includes one ultrasonic receiver R2 and one ultrasonic sensor S2, while a sound wave transmitting means 161 is provided on one or more sides of the relay keyboard 1 for running to the corresponding ultrasonic sensor S2 so as facilitate ultrasonic wireless coupling with the ultrasonic wireless mouse or trackball device 32.

Figure 14:
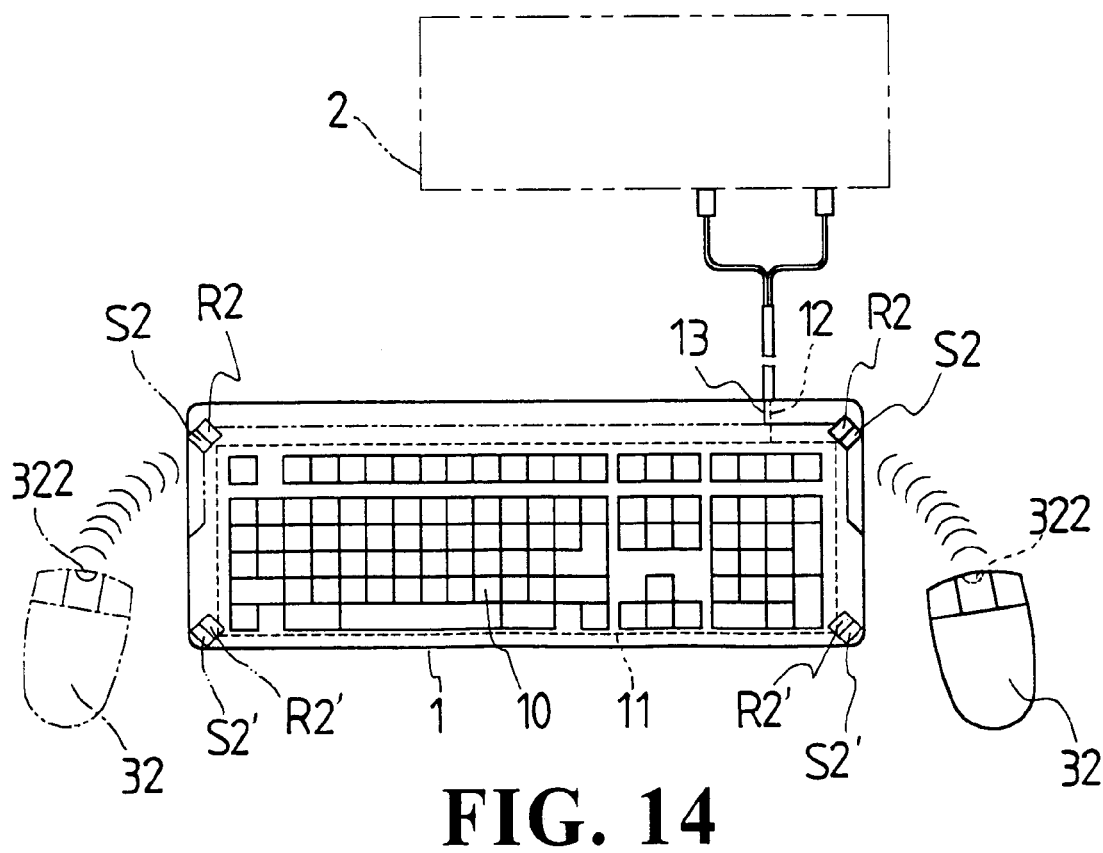
FIG. 14 illustrates an embodiment in which two sets of ultrasonic receiving circuit devices and ultrasonic sensors are concurrently provided on each side of the relay keyboard.

As shown in FIG. 14, two or more sets of ultrasonic receivers R2 and ultrasonic sensors S2 are concurrently installed on two or more sides of the relay keyboard 1. Operation may be executed in parallel or selectively with a switch.

Figure 15:
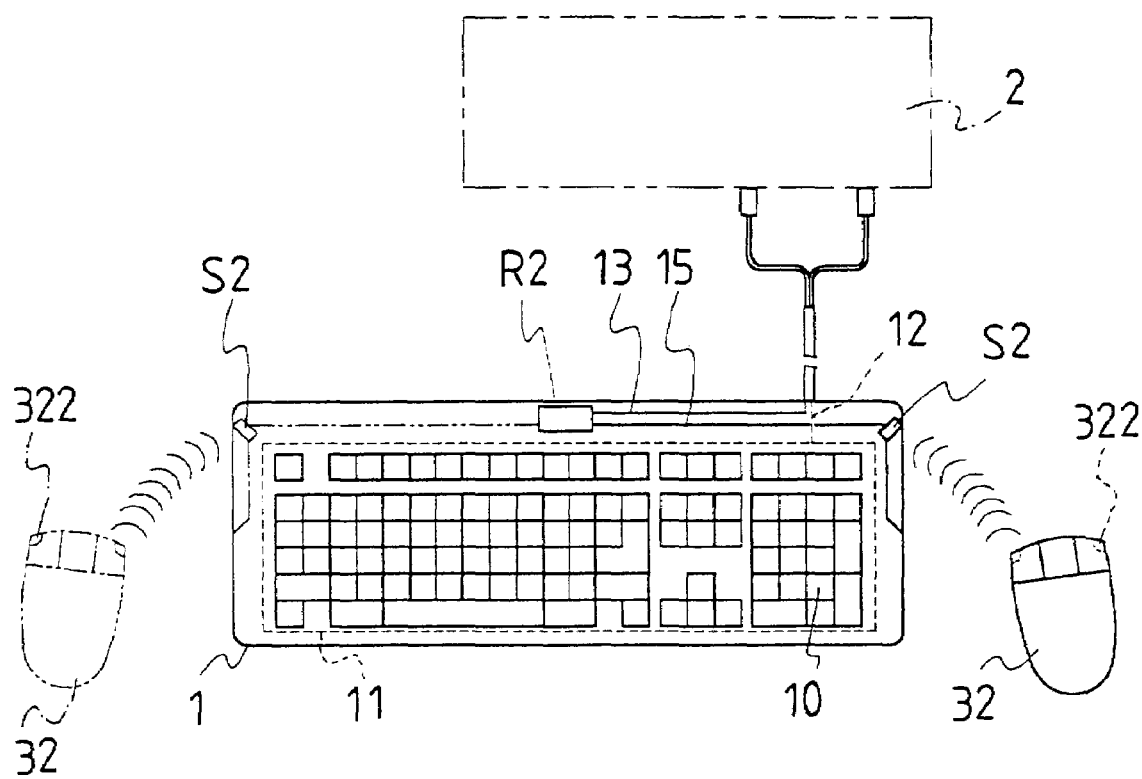
FIG. 15 illustrates an embodiment in which a sound wave passage channel is installed on one or more side of the relay keyboard, for coupling with an ultrasonic sensor that forms part of the ultrasonic receiving circuit device.

In the embodiment as shown in FIG. 15, at least one common ultrasonic receiver R2 and respective plural sets of ultrasonic sensors S1 attached, at a chosen angular setting, to two or more sides of the relay keyboard 1, and arranged for parallel operation or through a switch for or interaction with ultrasonic receiver R2.

Figure 16:
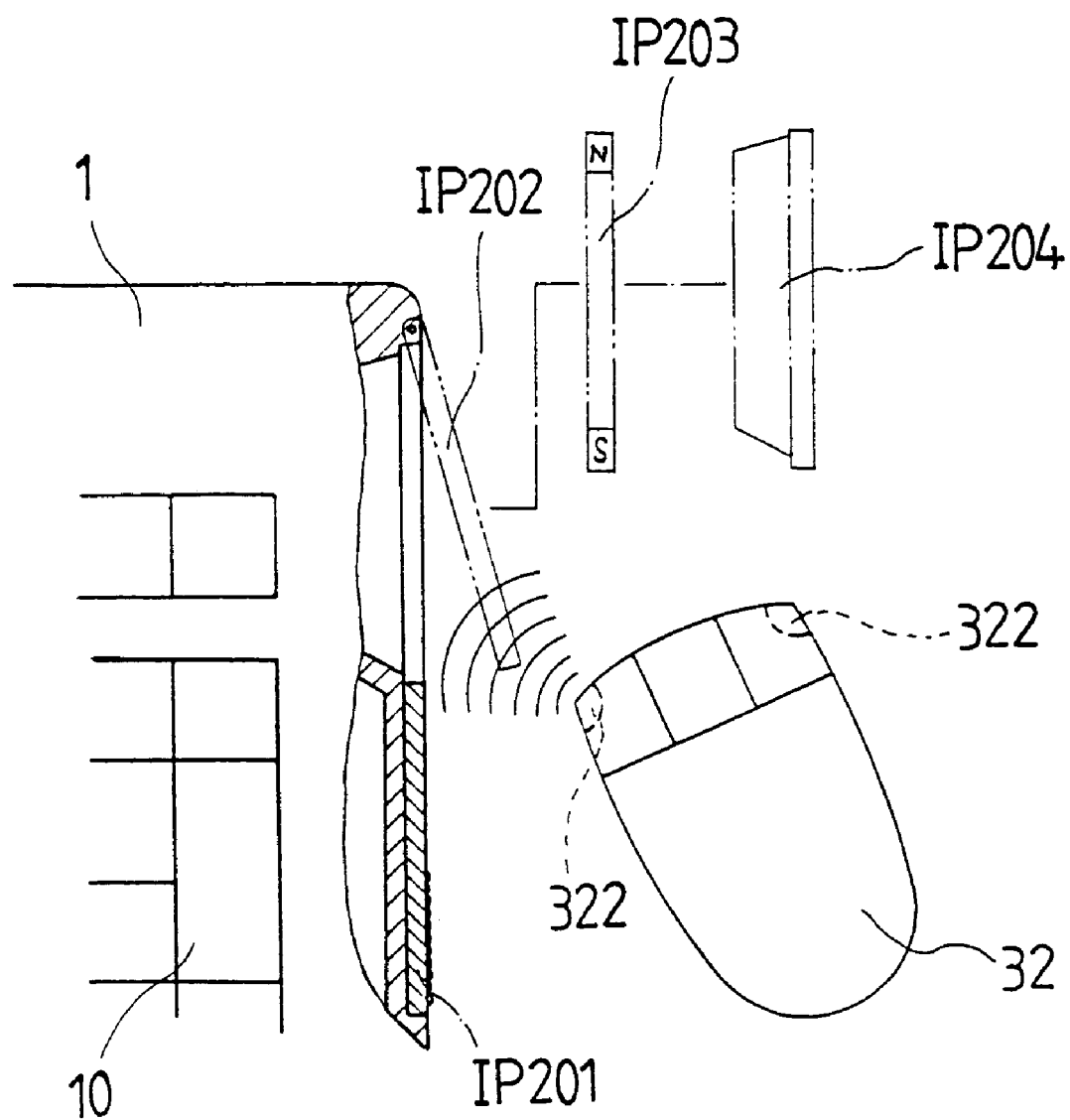
FIG. 16 illustrates an embodiment in which one set of ultrasonic receiving circuit devices is equipped with one or two sets of ultrasonic sensor units.

In the embodiment illustrated in FIG. 16, the sound transmission means described in reference with FIGS. 12–15 is attached at a chosen angle to a chosen side of the relay keyboard 1. Also, the end surface is preferably capable of focusing sound-waves, and set at a recess into a broad side of the casing so as to minimize interference. The ultrasonic access port of the casing may be further provided with a push-pull type ultrasonic blocking board IP201, snap-on type ultrasonic blocking board IP202, solenoidal suction type ultrasonic blocking board IP203, or a closable ultrasonic blocking plug IP204 which is coupled to the casing, so as to effect optional blocking with respect to part of the access port, so that interference is kept to the minimum.

Figure 17:
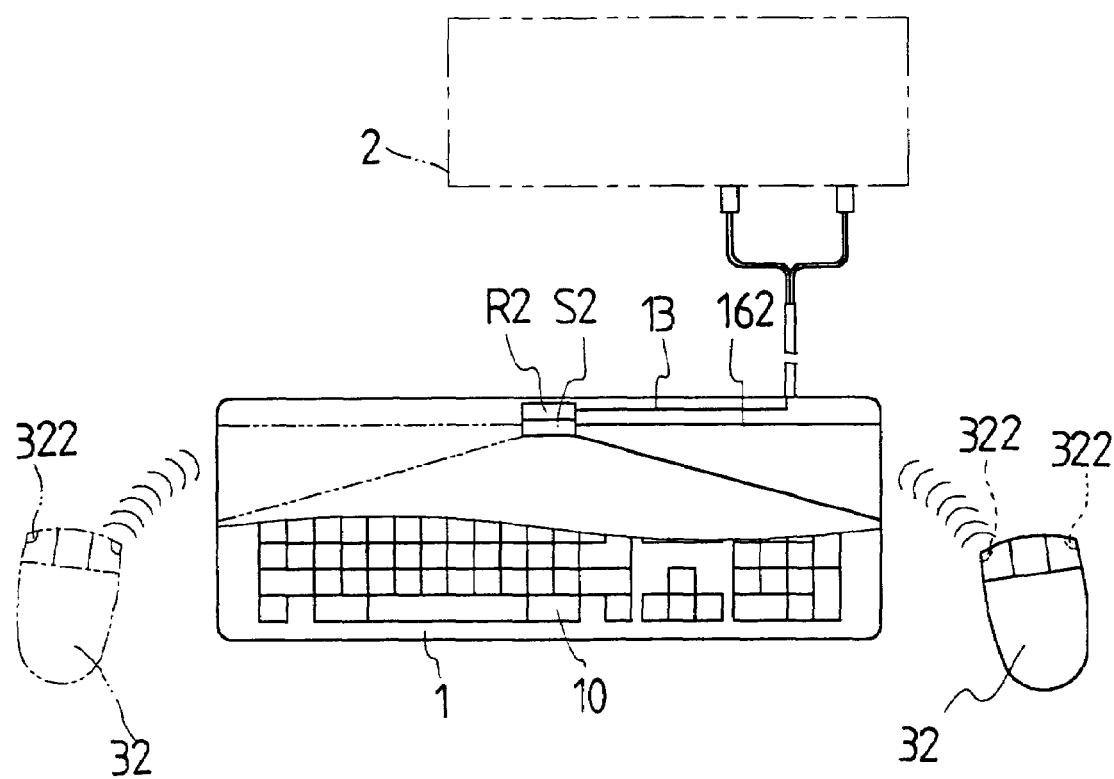
FIG. 17 illustrates an embodiment in which one set of ultrasonic receiving circuit devices, ultrasonic sensor unit being included, is matched to one set or two sets of ultrasonic sensor devices.

In the embodiment illustrated in FIG. 17, it is also feasible to provide, on one or more sides of the relay keyboard 1, an ultrasonic signal access channel 162 of which the inner wall exhibits reflection capabilities so as to effect coupling with the ultrasonic sensor S2 in relation to the ultrasonic receiver R2. As a result, the signal incoming from an ultrasonic wireless mouse or trackball device 32 via the emitter 322 may be collected by the above-mentioned ultrasonic signal access channel 162 and relayed, thanks to its reflection capabilities, to form an ultrasonic wireless with ultrasonic sensor S2 and receiver R2. The ultrasonic signal access channel 162 is available in the form of the casing. The inner wall of the ultrasonic signal access channel 162 is vacuum plated to provide an ultrasonic reflection surface, finished by ultrasonic reflection or other paints, prepared by bonding or sleeving of ultrasonic reflection metal sheets, or by the means so as to reflect any incoming ultrasonic waves in a desired direction. The aperture of the ultrasonic signal access channel 162 may assume a trumpet profile to set the orientation of reception, so that interference is kept to the minimum. In addition, it is also feasible to have a push-pull type ultrasonic blocking board IP201, a snap-on type ultrasonic blocking board IP202, solenoidal suction type ultrasonic blocking board IP203, or closable ultrasonic blocking plug IP204 coupled to the casing such as is shown in FIG. 16, installed at the access port of the ultrasonic signal access channel 162, to effect partial isolation of the access port in view of operation environments, so that interference is kept to a minimum.

Figure 18:
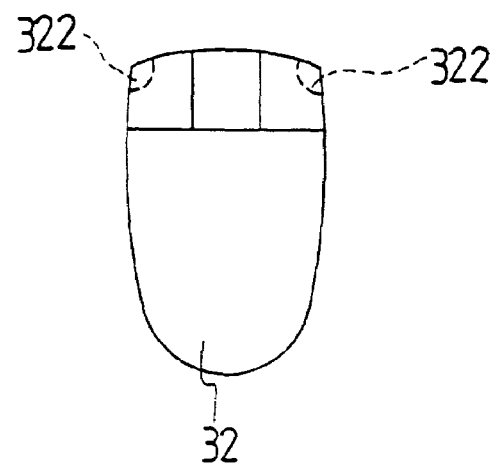
FIG. 18 illustrates an embodiment in which either side of the relay keyboard is, where required, selectively equipped with one or more sets of ultrasonic receiver circuit devices.
Figure 38:
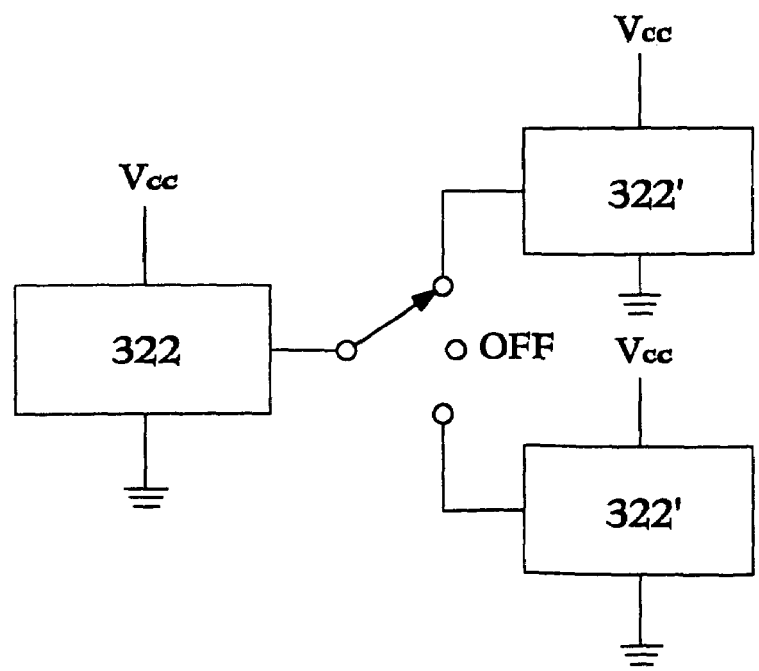
FIG. 38 illustrates an infrared emission circuit device that is subjected to parallel operation by the introduction of a switching means to permit selective operation of ultrasonic emission elements.
Figure 39:
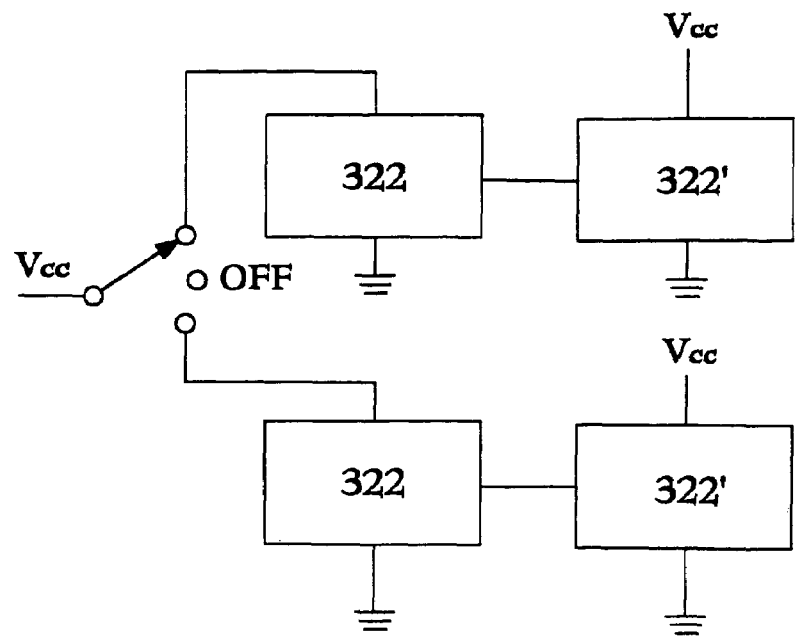
FIG. 39 illustrates a switchable ultrasonic emission circuit for an ultrasonic wireless mouse or trackball device.
Figure 40:
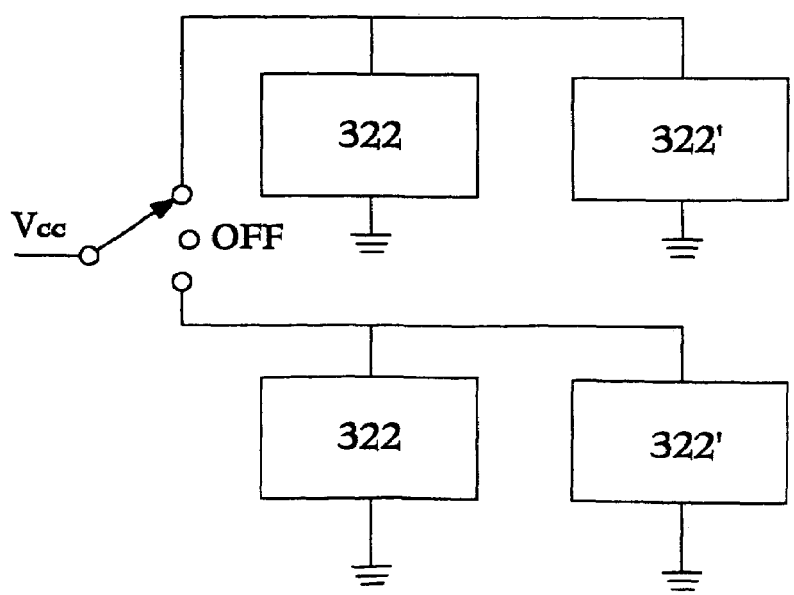
FIG. 40 illustrates an ultrasonic emission circuit device for an ultrasonic wireless mouse or trackball device capable of simultaneous switching at the same time.

In the illustration of FIG. 18, two or more sets of transducers 322' and a common set of ultrasonic emitters 322, or one or more sets of ultrasonic emitters 322 equipped with transducers 322' are provided on both sides of the frontal end of ultrasonic wireless mouse or trackball device 32. Optionally, a selectively functioning transducer 322' to be run by a switch, for contingent parallel operation, as shown in FIG. 38, may be prepared. Alternatively, the mouse or trackball may include an ultrasonic emitter 322 with switching means such as is shown in FIG. 39, or an ultrasonic emitter 322 permitting concurrent switching such as is exemplified in FIG. 40, to facilitate controlled operation from the left side or right side.

By all of the above-mentioned components working together, a signal sent from the ultrasonic emitter 322 of the independently installed ultrasonic wireless mouse or trackball device 32 may be emitted to any of the afore-mentioned ultrasonic sensors S2, where it is received and picked up for transmission to the ultrasonic receiver R2, thus consummating a wireless coupling using the keyboard 1 as an operational relay while avoiding component-to-component shielding and interference.

Figure 19:
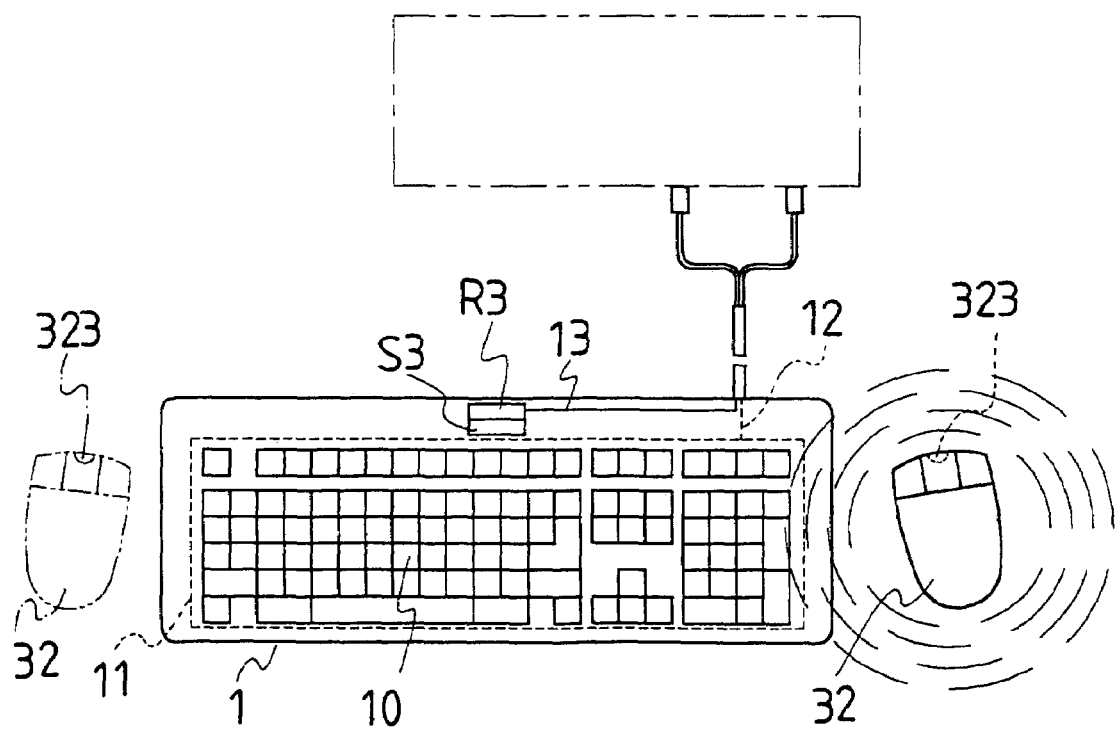
FIG. 19 illustrates an embodiment including an R.F. coupling.

In the example illustrated in FIG. 19, wireless R.F. coupling is used to connect the keyboard 1 and the independent mouse or trackball device 32.

Relay keyboard 1, which includes exterior pushkeys 10, and a pushkey circuit 11 corresponding to each operational pushkey 10 on the interior, the pushkey circuit 11 being linked to the main unit 2 by means of a keyboard transmission lead 12.

Relay lead 13 is installed at a chosen location inside the relay keyboard 1, with one end connected to the R. F. receiver R3 and the other end coupled to the main unit 2 by a wire extending in parallel with keyboard transmission lead 12, or alternatively by extension coaxially through a multiple core cable, directly or via a socket/plug assembly.

Independently installed R.F. mouse or trackball device 32 includes emission circuit 323 able to emit R.F. signals. Structured accordingly, it is possible to transmit signals from the R. F. emission circuit 323 of the independently installed R.F. mouse or trackball device 32 to any above-mentioned receiver R3, accomplishing wireless coupling in which keyboard 1 serves as an operational relay, clear and free of component-to-component shielding and interference, and the layout on the whole serving to provide of a clean and neat R.F. desktop environment.

Figure 20:
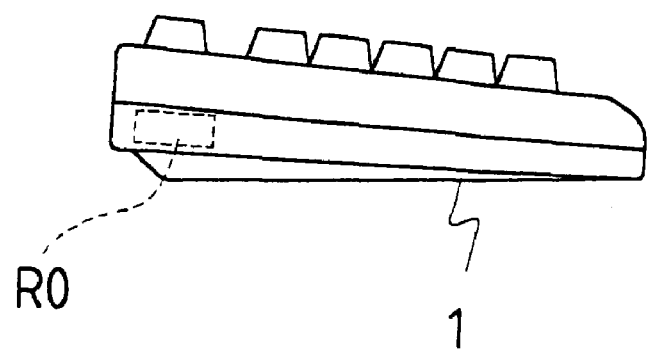
FIG. 20 illustrates an embodiment in which various assembling techniques, including locking, engagement, bonding, binding or absorption are employed to leave the wireless receiving devices and relay keyboards as individually housed units that can be used for innumerable wireless coupling applications.
Figure 21:
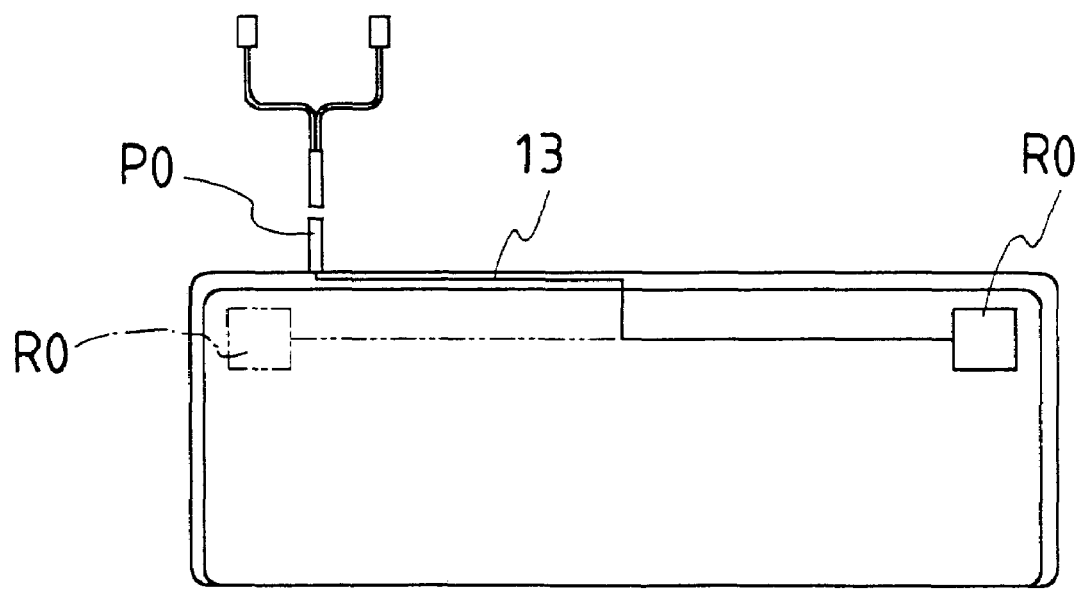
FIG. 21 is a side view sketch of the illustration given in FIG. 20.
Figure 22:
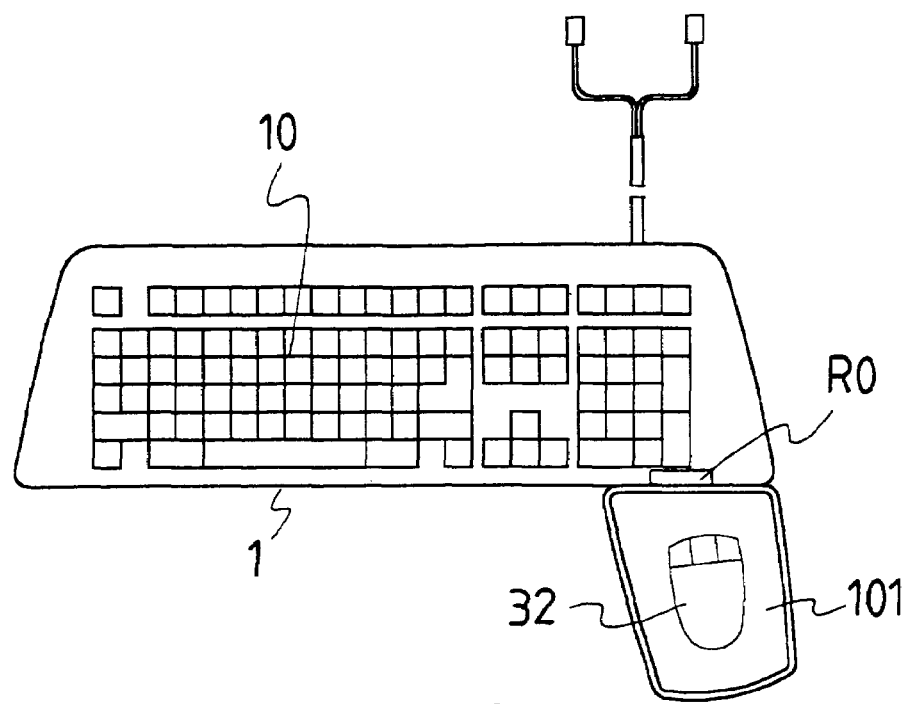
FIG. 22 illustrates an embodiment in which a one-piece mouse pad structure forms an integral part of a chosen side of the relay keyboard.

In any or all of the above embodiments, the infrared, ultrasonic, or R.F. coupling assembly can be in the form shown in FIG. 20 or FIG. 21, in which wireless receiver R0 includes infrared receive circuit device R1, including infrared sensor S1, an ultrasonic receive circuit device R2, including ultrasonic sensor S2, or R.F. receiver R3, stands alone independent of the relay keyboard 1, or is assembled to the keyboard by locking, engagement, bonding, or suction adhesion, and is coupled to the relay leader 13 on the relay keyboard 1 by direct wiring or by the intervention of similar or dissimilar conventional PS2, USB, SERIES or special purpose interface plug and socket assemblies P0. Alternatively, receiver R0 may be structured integral with relay keyboard 1. In either case, the location meant for locking, engagement, bonding or suction adhesion may be on one or both sides of the relay keyboard 1 and similar structure or spacing will ensure that once combined together, either the wireless mouse or trackball device 32 will exhibit good wireless transmission functioning with respect to the receiver R0 in a setting beneficial to wireless transmission.

Also in any of the above-described embodiments it is feasible to have an integrally formed or separately assembled mouse pad structure 101, or multiple such mouse pads installed on one or both sides, at a chosen angle, of the relay keyboard 1. The mouse pad(s) serve as an operational platform for the independently installed wireless mouse or trackball device 32.

Figure 23:
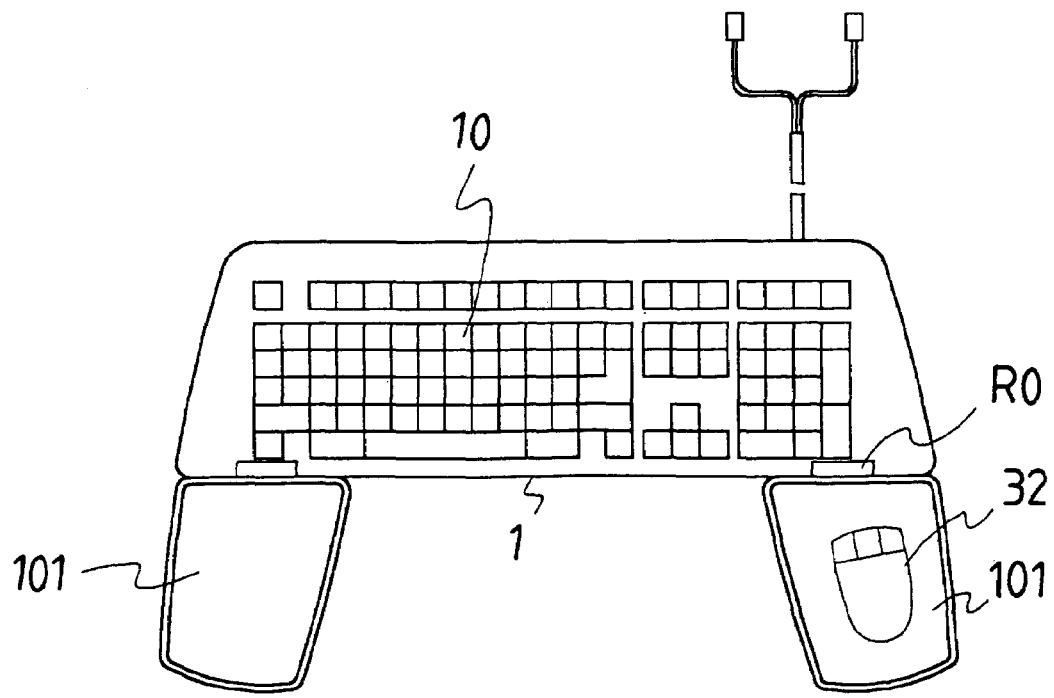
FIG. 23 illustrates an embodiment in which a one-piece mouse pad structure is integrally equipped on either side of the relay keyboard.
Figure 24:
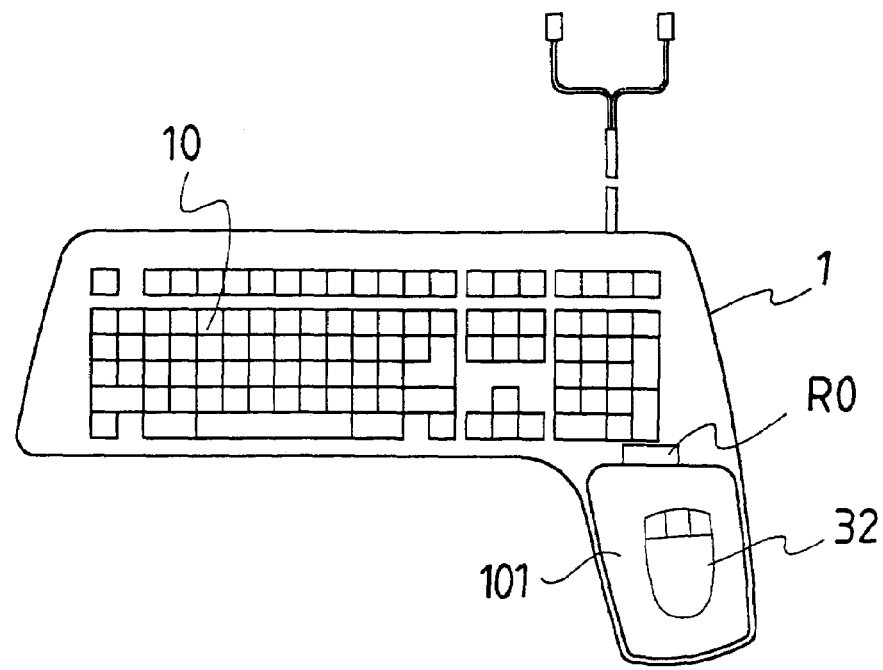
FIG. 24 illustrates an embodiment in which a one-piece mouse pad structure is integrated on one side at a chosen angular setting of the relay keyboard.
Figure 25:
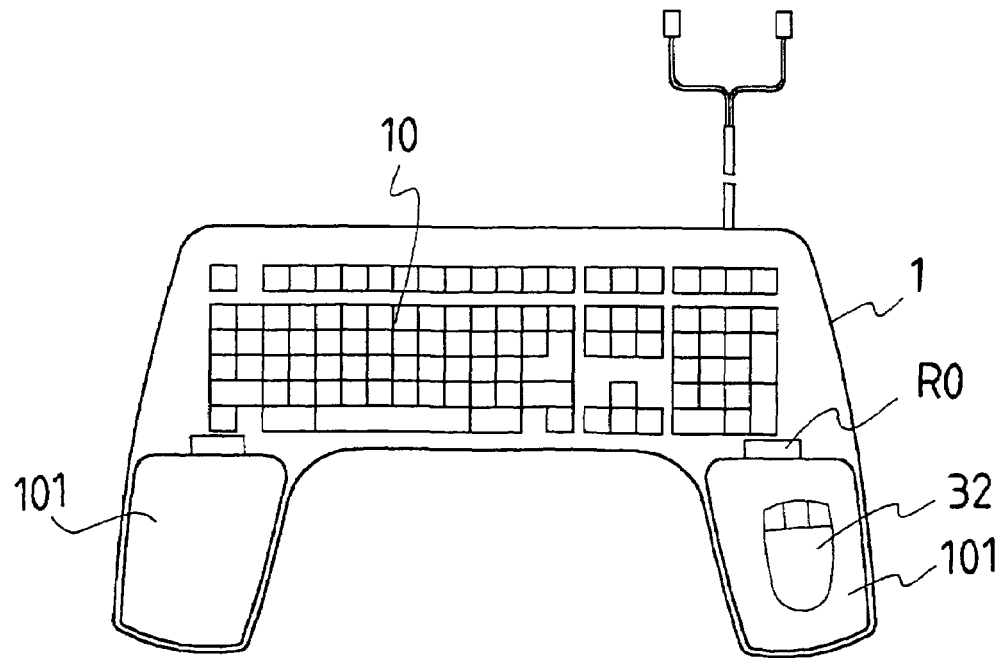
FIG. 25 illustrates the invention in one embodiment in which a one-piece mouse pad structure is integrated concurrently one either side, at a chosen angular setting, of the relay keyboard.
Figure 26:
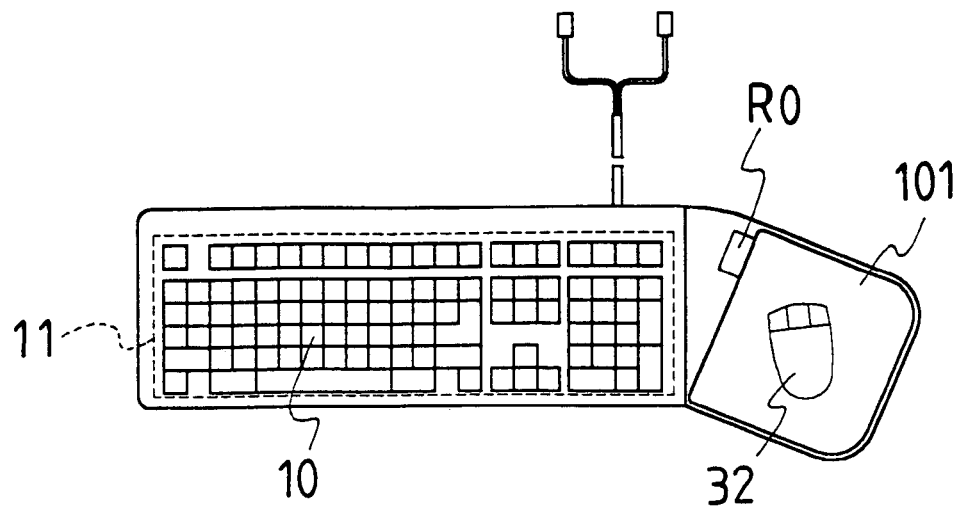
FIG. 26 illustrates an embodiment in which the mouse pad structure is fitted by detachable assemblage onto either side of the relay keyboard.
Figure 27:
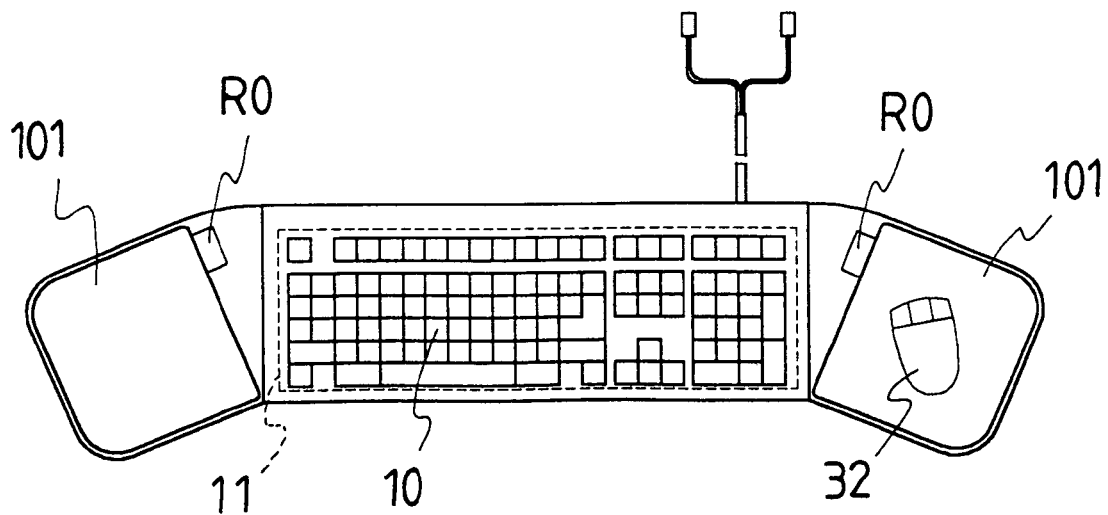
FIG. 27 illustrates an embodiment in which the mouse pad structure is fitted detachably to either side of the relay keyboard.

As shown in 22, a mouse pad structure 101 is integrally structured on a chosen side of the relay keyboard 1. In contrast, FIG. 23 shows instead an integrally structured mouse pad structure 101 present on both sides of the relay keyboard 1, FIG. 24 shows an integrally structured mouse pad 101 installed at a chosen angle on one side of the relay keyboard, and FIG. 25 shows an integrally structured mouse pad 101 installed on both sides at a chosen angle on either side of the relay keyboard 1. Finally, FIG. 26 shows a relay keyboard 1 installed with a separately assembled mouse pad structure 101, and FIG. 27 shows a mouse pad structure 101 that is separately assembled on both sides of the relay keyboard 1.

Figure 28:
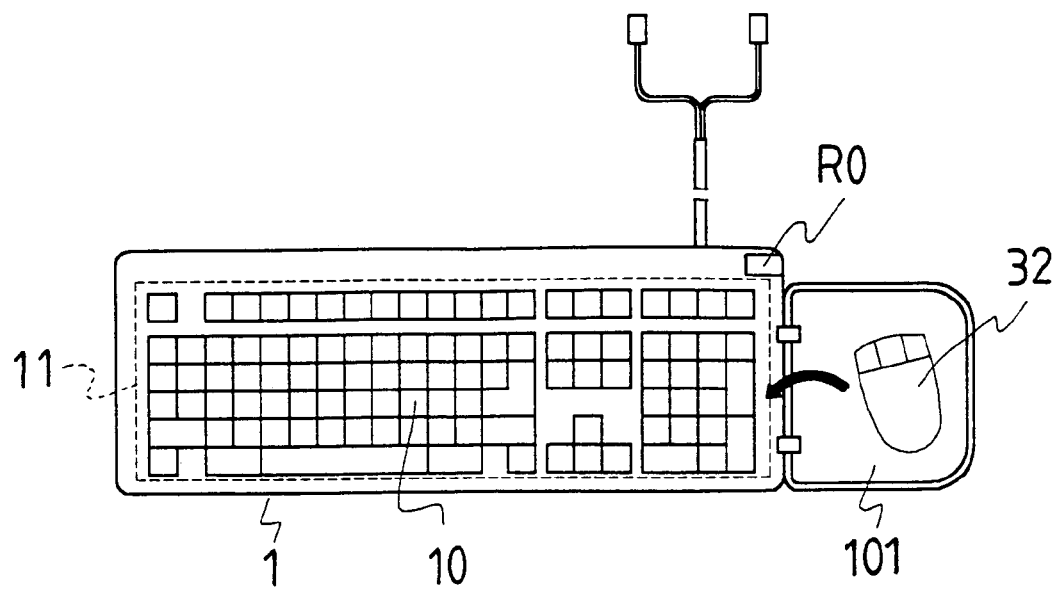
FIG. 28 illustrates an embodiment in which the mouse pad structure is pliably and movably bound to a chosen side of the relay keyboard.
Figure 29:
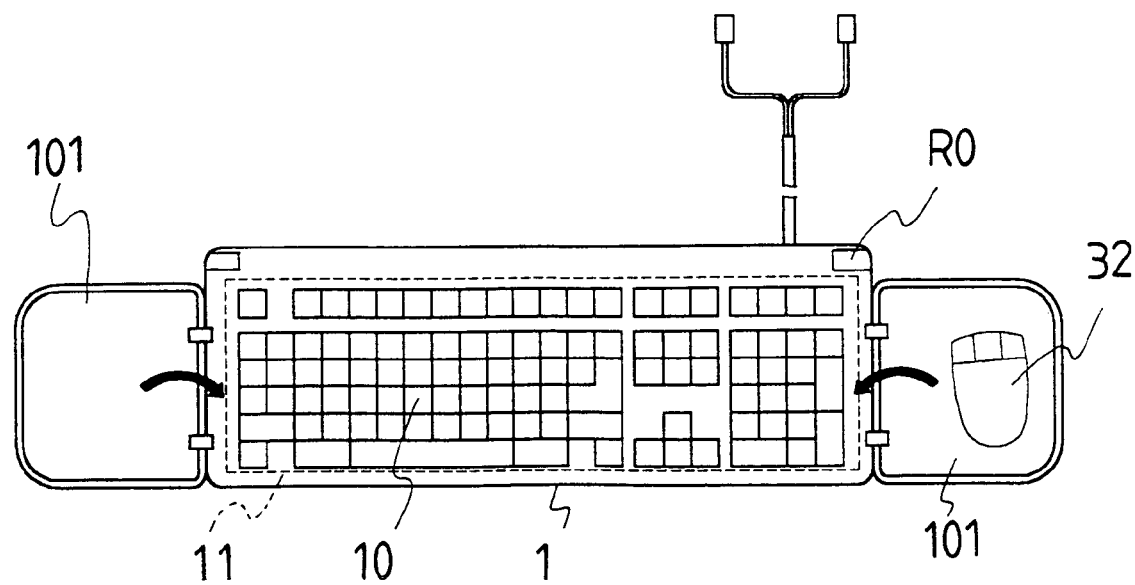
FIG. 29 illustrates an embodiment in which the mouse pad structure is pliably and movably bound to either side of the relay keyboard.
Figure 30:
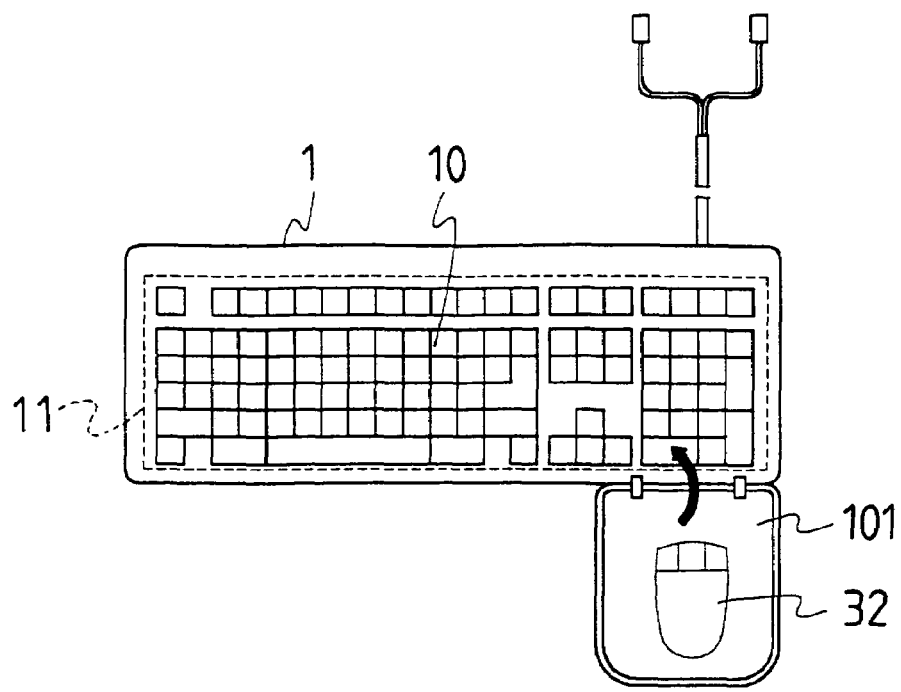
FIG. 30 illustrates an embodiment in which the mouse pad structure is pliably and movably attached to a chosen side of an edgewise wall on the bottom of the relay keyboard.
Figure 31:
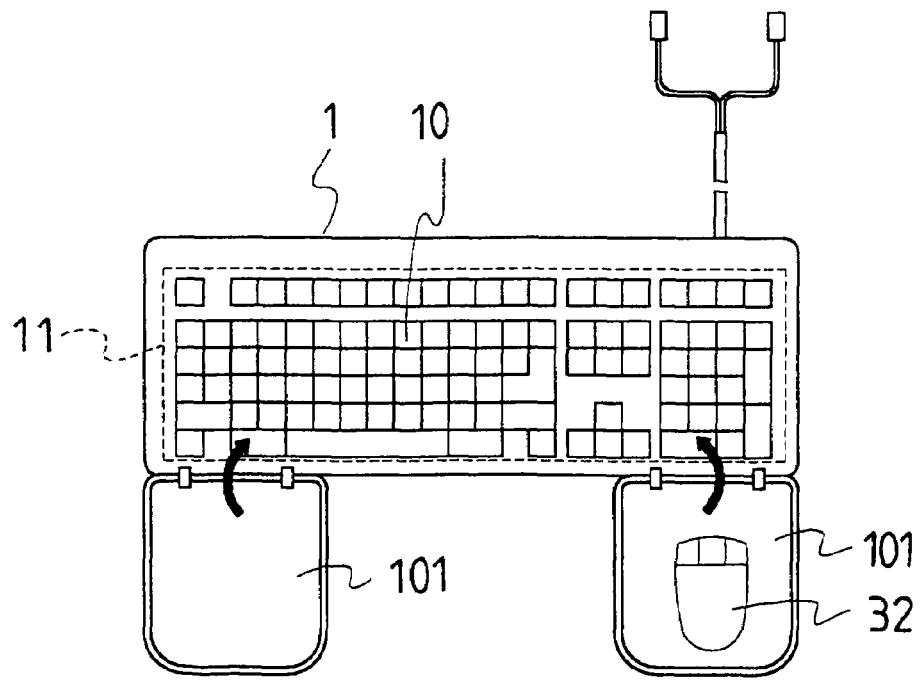
FIG. 31 illustrates an embodiment in which the mouse pad structure is pliably and movably attached to either side of an edgewise wall on the bottom of the relay keyboard.

The structural relationship between the aforementioned mouse pad structure 101 and the relay keyboard 1 can be such that both are related to each other in a flexible manner so that the mouse pad structure 101 is movably articulated to a chosen side or both sides of the relay keyboard 1, as shown in FIG. 28 and FIG. 29 respectively. Alternatively, the mouse pad structure 101 may be movably articulated to a chosen side on the lower edge of a wall of the relay keyboard 1, or. else to both sides thereon, as shown in FIG. 30 and FIG. 31.

As to possible combination and permutation of various mouse pad structures 101 with the relay keyboard 1, so far as execution of wired coupling is concerned, the layout of keyboard transmission lead or cable 12, relay lead or cable 13, coupling socket 14 or conductor assembly 15 may be implemented according to the illustrations covered in FIGS. 1–4 (wired), FIGS. 5–11 (infrared), FIGS. 12–18 (ultrasonic), and FIG. 19, all as described above. The mouse pad structure 101 may be a plane structure or to ensure that while the wireless mouse or trackball device is operating within a defined scope, with good coupling maintained between the infrared, ultrasonic, or R.F. emitter 321 or 322 or 323 and the infrared, ultrasonic, or R.F. sensor S1, S2 or S3, it is advisable to build a notched recess surrounding the mouse padding structure 101. The notched recess may be reinforced with apron fensing, overall or on the periphery of both sides, so as to facilitate concurrent utility on both sides. The aforementioned single mouse padding structure 101 may be attached to a lateral side, right or left, of the relay keyboard 1, at the user's discretion.

Figure 32:
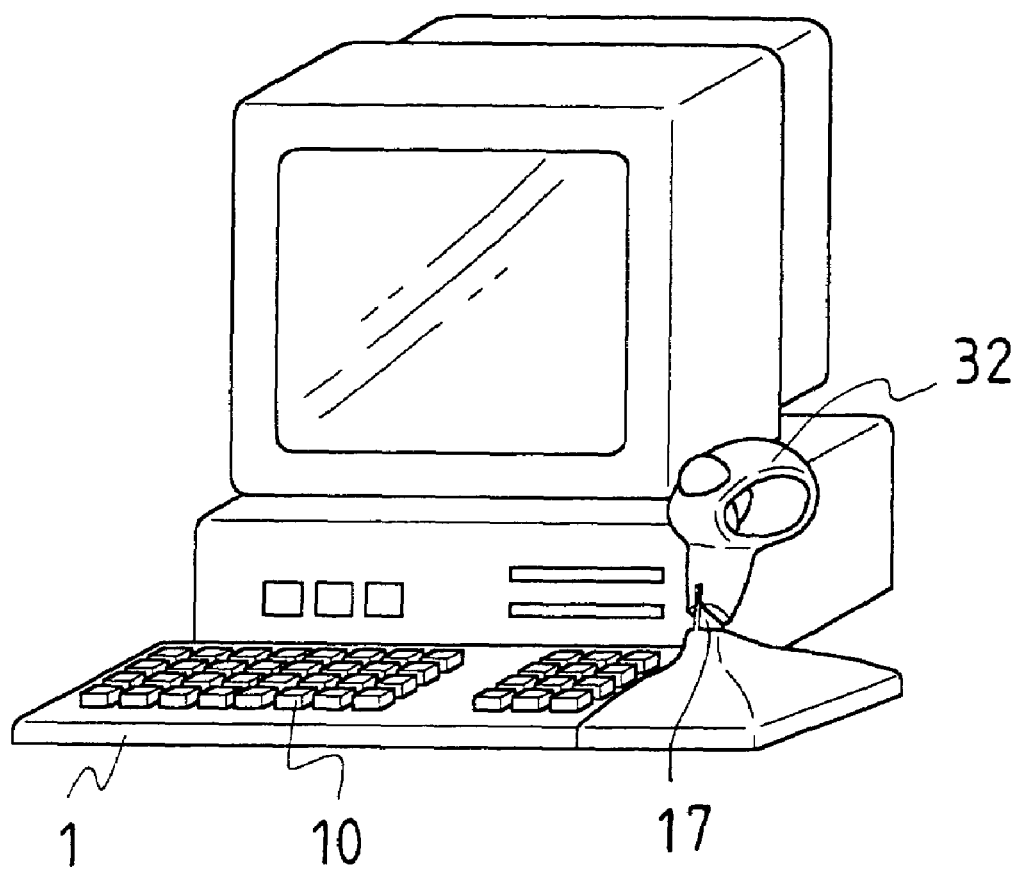
FIG. 32 illustrates an embodiment in which a retainer means is provided independently on a chosen side of the relay keyboard to facilitate fitting of a wired or wireless mouse or track ball device thereto.

Moreover, the invention may be structured so that the mouse pad structure 101 installed on a chosen side of the relay keyboard 1 may incorporate a retainer or clamps 17 (FIG. 32) for the independently installed wired or wireless mouse or trackball device 31, 32, with respect to which a mouse or trackball device may, once retained thereby, swing about.

Figure 33:
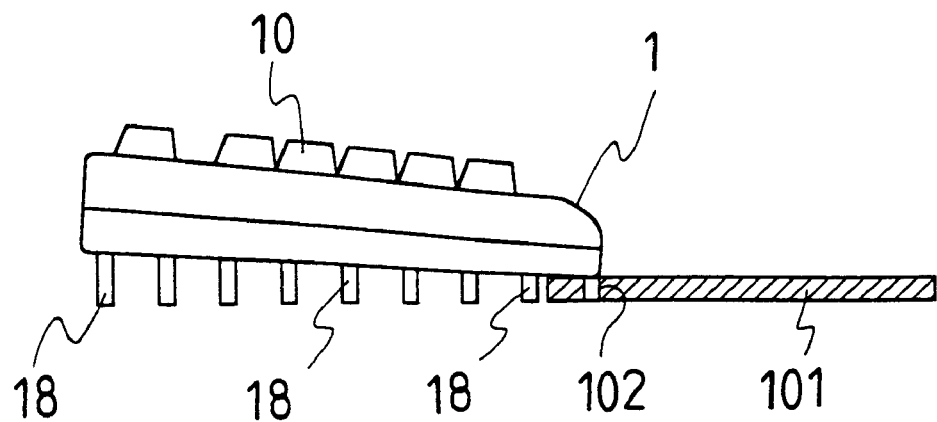
FIG. 33 illustrates an embodiment in which one or more access hole is provided on the relay keyboard panel to facilitate fitting of a mouse pad structure.
Figure 34:
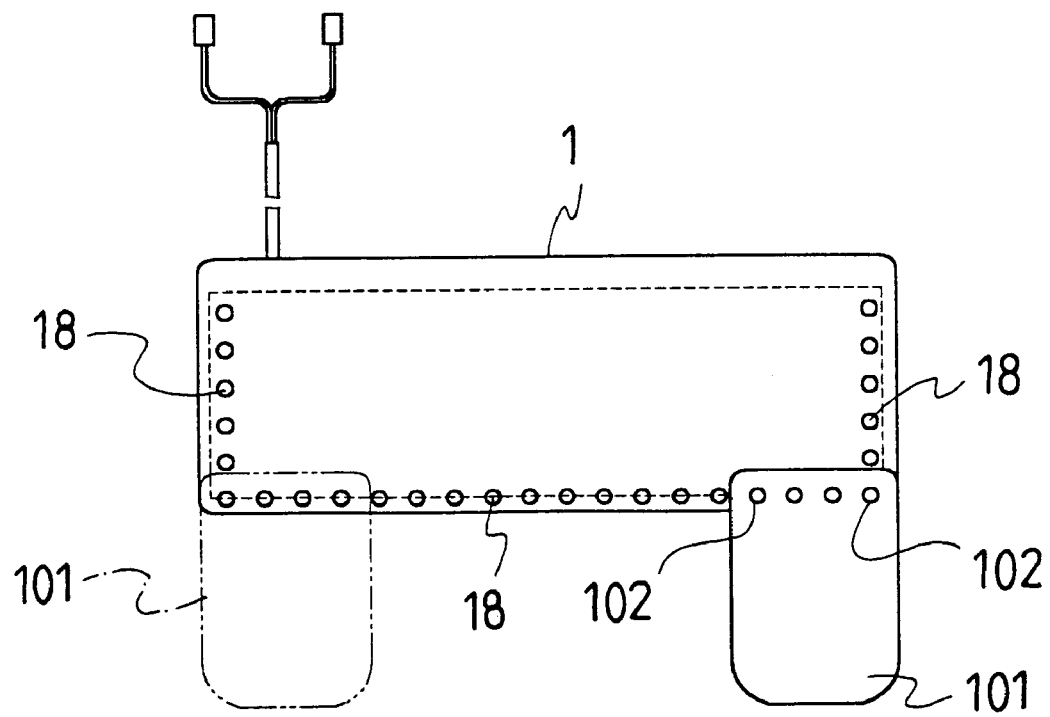
FIG. 34 is a bottom view of what is illustrated in FIG. 33.
Figure 35:
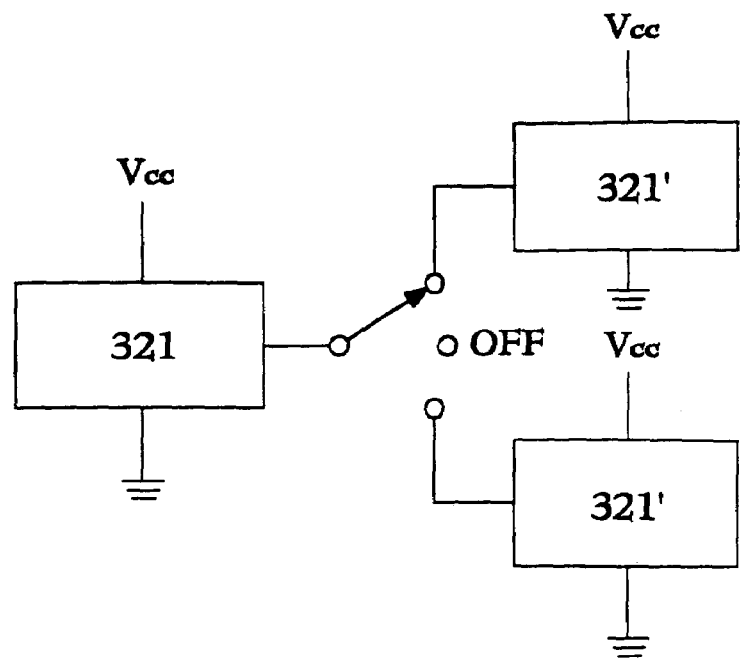
FIG. 35 illustrates selective operation of infrared emission elements by means of a switching means provided to govern the parallel operation of the infrared emission circuit device associated with an infrared wireless mouse or track ball device.

Also, as shown in FIG. 33 and FIG. 34, the structural correlation between the above-mentioned mouse pad structure 101 and the relay keyboard 1 may be such that, on a chosen location of the panel side of the independently installed mouse pad structure 101, one or more access holes 102 are punched, while on the lateral wall which is opposite to the bottom of the relay keyboard 1 one or more coupling pillars 18 are installed, so that pillars 18 of the mouse pad structure 101 may be inserted selectively in holes 102 to for a match perfect for mouse operations.

Figure 41:
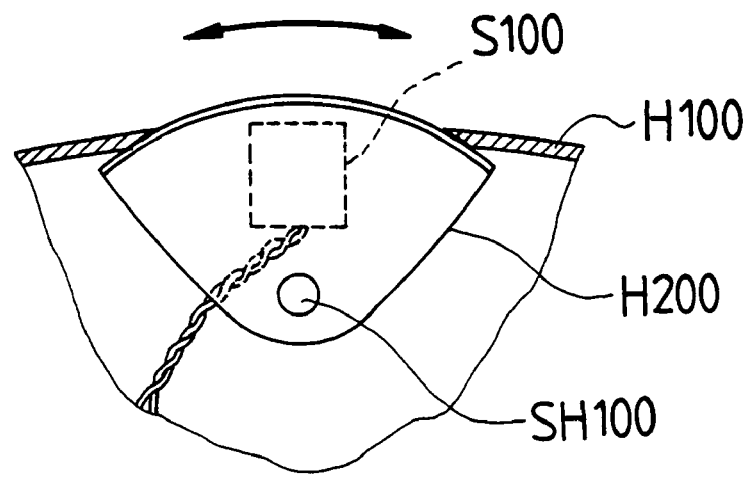
FIG. 41 illustrates a mechanism meant for adjustment of the angle of inclusion in the azimuthal direction for correlating a direction of emission with the direction of reception.
Figure 42:
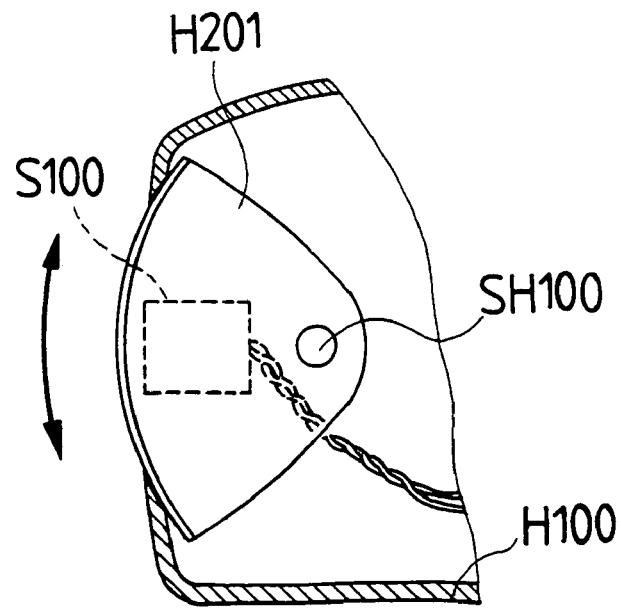
FIG. 42 illustrates a mechanism meant for adjustment of the pitch of both the direction of emission and the direction of reception.
Figure 43:
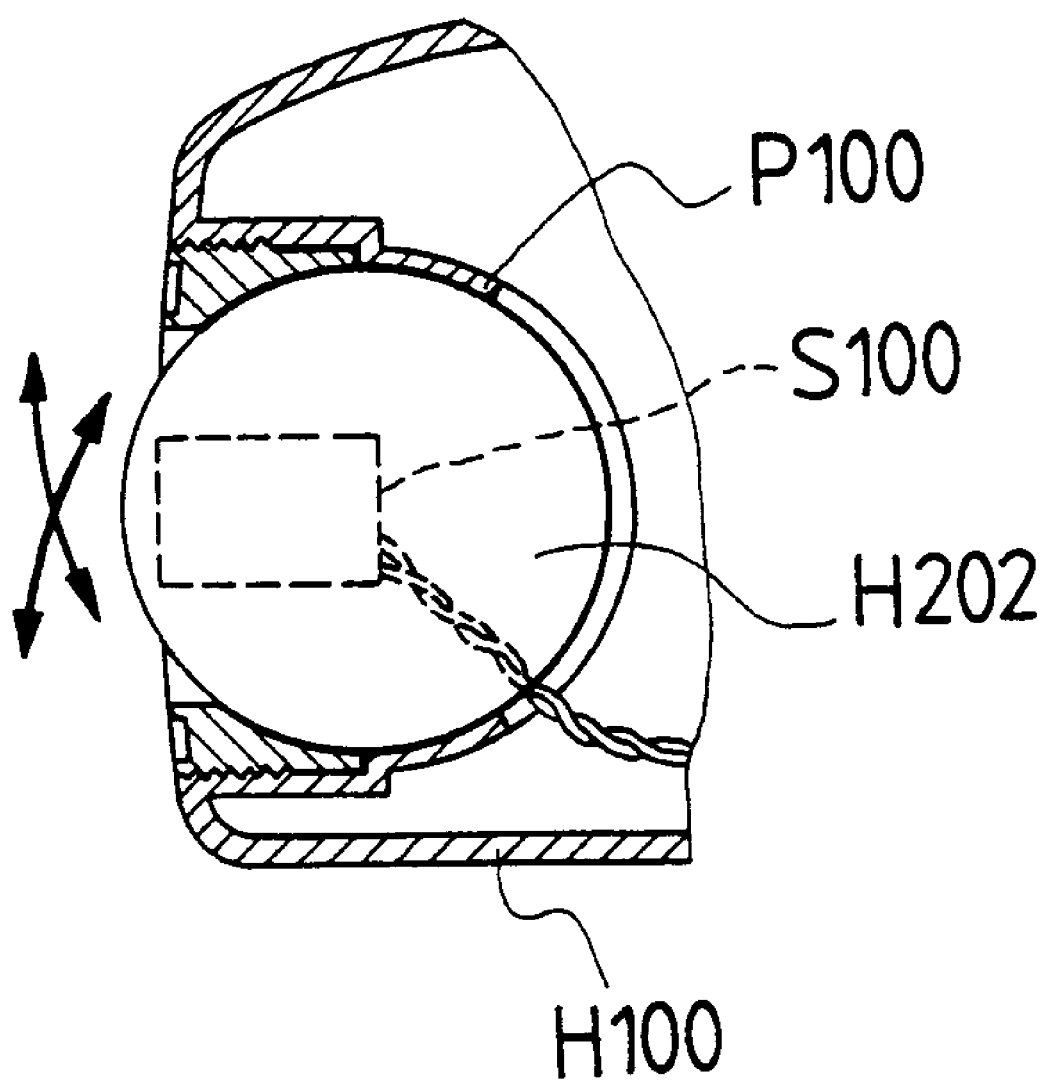
FIG. 43 illustrates a mechanism which permits spheroidal, universal adjustment of the direction of emission and the direction of reception.
Figure 44:
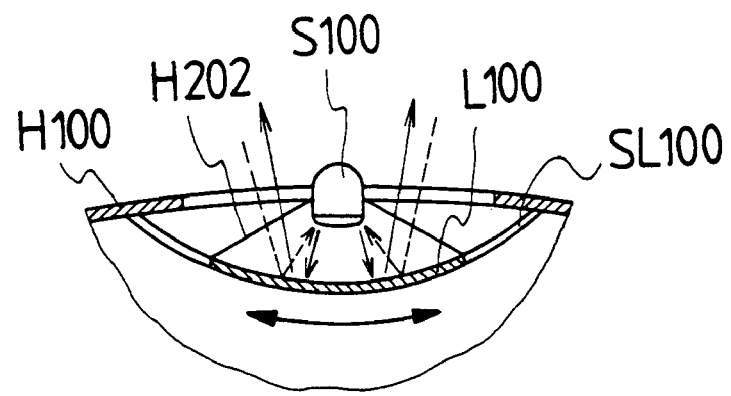
FIG. 44 illustrates, according to the invention, infrared or ultrasonic orientation deflector assembly with respect to which the direction of emission and the direction of reception may be adjusted to yield a desired angle of inclusion corresponding to horizontal deflection in either or both directions.
Figure 45:
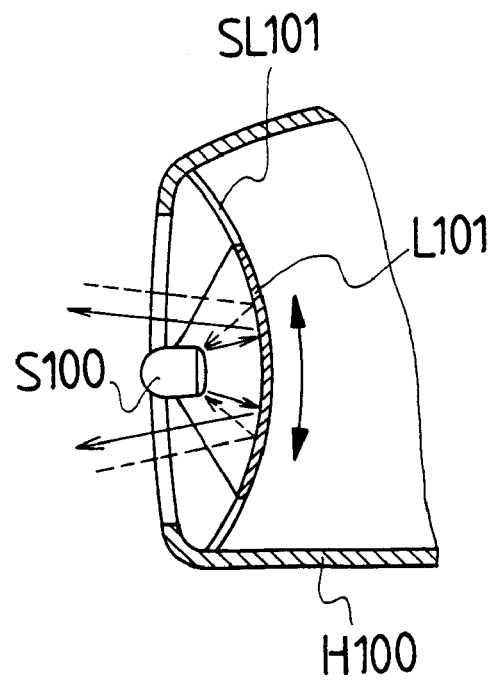
FIG. 45 illustrates an infrared or ultrasonic orientation deflection assembly whereby the direction of emission or direction of reception may have their respective pitch of deflection adjusted vertically.
Figure 46:
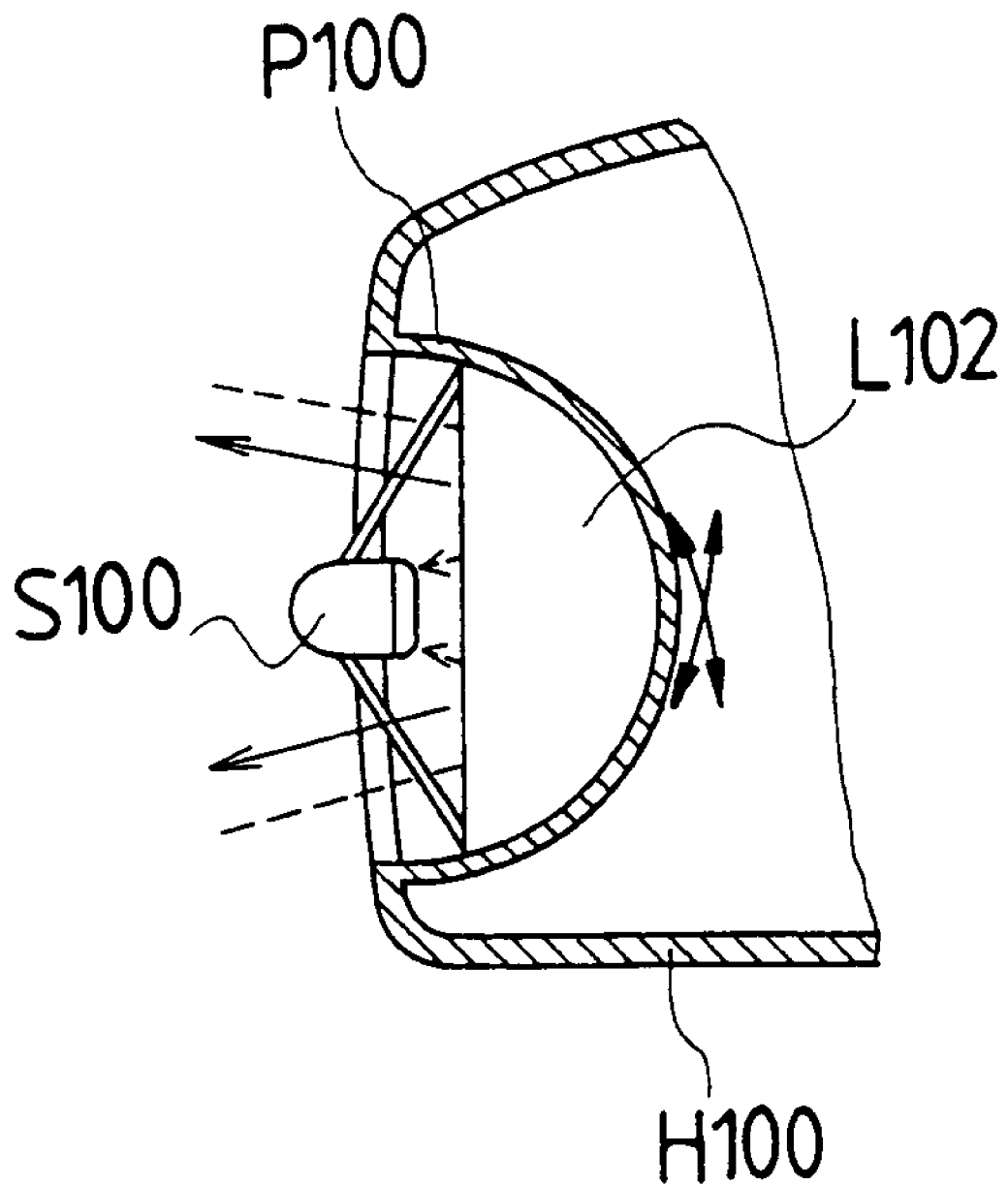
FIG. 46 illustrates an infrared or ultrasonic orientation deflection assembly whereby the direction of emission and direction of reception may have their respective deflections adjusted in all directions.

Moreover, to promote interaction between the directionally sensitive infrared or ultrasonic wireless mouse or trackball device 32 and the respondent receiver, as illustrated in FIGS. 5–18, it is preferable to make the reception/emission angular setting adjustable relative to (A) the infrared emission element 321' or common circuit shared by it and the infrared emitter 321, and the wireless mouse or trackball device 32 casing; (B) the ultrasonic transducer 322' or common circuit shared by it and the ultrasonic emitter 322, and the wireless mouse or trackball device 32 casing; (C) the infrared sensor S1 or a common circuit shared by it and the infrared receiver R1, and the relay keyboard 1 casing; (D) the ultrasonic sensor S2 or common circuit shared by it and the ultrasonic receiver R2, and the relay keyboard 1 casing; or between the infrared sensor S1, the ultrasonic sensor S2 and the relay keyboard. This can be achieved by (1) an adjustment setting means H200 for adjustment of the horizontal angle of inclusion, as shown in FIG. 41, to the emission orientation or the reception orientation, setting means H200, to which is mounted infrared emission element 321' or ultrasonic emission element 322', or infrared reception element S1 or ultrasonic reception element S2 along its rotation shaft SH100, and then coupled with casing H100 to adjust and set the reception/emission orientation of the aforementioned emission elements and reception elements S100; (2) a pitch adjustment setting means H201, illustrated in FIG. 42, for accommodating pitch adjustment of both emission orientation and reception orientation, and to which is mounted an infrared emission element 321', or ultrasonic emission element 322', or infrared reception element S1 or ultrasonic reception element S2 along its rotation shaft SH100, which is coupled with casing H100 to serve to adjust and set the reception/emission orientation of the aforementioned emission elements and reception elements S100; (3) an adjustment setting means H202 accommodating spheroidal, universal directional adjustments, illustrated in FIG. 43, to which is mounted an infrared emission element 321', or ultrasonic emission element 322, or infrared reception element S1, or ultrasonic reception element S2 along its spheroidal mounting element receiving socket P100 for spheroidal, universal directional adjustments, the adjustment setting means H202 being coupled with the casing H100 to adjust and set the reception/emission orientation of aforementioned emission element and reception element S100; or (4) an infrared or ultrasonic orientation deflection device H202 capable of adjusting horizontal angle of inclusion, illustrated in FIG. 44 and serving to adjust the angle of inclusion of horizontal deflection respecting both emission orientation and reception orientation, represented by the reference number H202, a guide channel SL100 which incorporates an arched deflection lens L100 being mounted with an infrared emission element 321', or ultrasonic emission element 322' or infrared reception element S1 or ultrasonic reception element S2 so that adjustment of the angle of inclusion of horizontal deflection respecting any of the foregoing elements is made possible, the device H202 is then being coupled with the casing H100 and serving to adjust and set the emission/reception orientation of aforementioned emission elements and reception elements S100; (5) an infrared or ultrasonic orientation deflection device H2002 indicated for pitch adjustments, illustrated in FIG. 45, to which is mounted an infrared reception element 321', or ultrasonic emission element 322', or infrared reception element S1, or ultrasonic reception element S2 installed thereon, and in which pitch adjustment is made possible respecting any of these elements along a guide channel SL101 which incorporates an arched deflection lens L101 coupling with the casing H100 so that it is ready to effect adjustment and setting of the emission/reception orientation of aforementioned emission elements and reception elements S100; or (6) an infrared or ultrasonic orientation deflection device H202 capable of spheroidal, universal directional adjustments as illustrated in FIG. 46, and arranged to provide spheroidal, universal directional deflection adjustments respecting infrared emission element 321', or ultrasonic emission element 322', or infrared reception element S1 or ultrasonic reception element S2 which are all to be mounted thereto, the adjustments being made along the spheroidal socket P100 which incorporates a concave deflection lens L102, the device H202 being coupled with the casing H100 to adjust and set the reception/emission orientation of aforementioned emission/reception element S100.

Each of the above-described adjustment or setting means or orientation deflection assemblies further comprises a structural characteristic feature in that the assemblies can be installed between the emission or reception assembly and the casing, or alternatively, between a common structure embodying such an assembly and an emission or reception circuit provided on a infrared or ultrasonic wireless mouse or trackball device which by itself incorporates an independent receiver.

Any execution of the invention, featuring the coupling of the aforementioned mouse or trackball device capable of wireless or wireless coupling output to a relay keyboard, will also find application in a notebook computer which integrates the casing with the keyboard, so that the relay leader 13 is converted to be an internal liaison means interconnecting the casing with the keyboard, and in which one end is coupled to a radio receiver composed of an infrared, ultrasonic, or R.F. receiver R0, the receiver R0 being supplied with conductor units to feed one or more sets of infrared, ultrasonic, or R. F. sensors S0 installed on one or more sides of the keyboard of a notebook computer, sensors S0 being available for parallel operation or alternatively selective operation by the intervention of a switch provided therefor. By the same token, the aforementioned one or more sets of infrared sensor or ultrasonic sensor S0 installed on one or more sides of the notebook computer keyboard may be installed with a push-pull type infrared or ultrasonic blocking board IP101 (IP201), snap-on type infrared or ultrasonic blocking board IP102 (IP102), solenoidal suction type blocking board IP103 (IP203), or closable infrared or ultrasonic blocking board IP104 (IP204) for coupling to the casing to selectively isolate part of the access port as justified in view of operation environments to reduce interference.

In summation, the mouse or trackball device of the invention uses a keyboard as an operational relay. The keyboard is simply structured, easily controlled, and will truly resolve the problems of kinks and mess on a desktop due to presence of redundant wires and lead, as well as eliminate component to component shielding and interference.

All that which has been so far disclosed in the foregoing represents but certain non-limiting examples meant to elucidate the technical contents of the invention, to which is intended to cover adaptation and variation that might occur to persons skilled in the art without departing from the spirit and scope of the invention.

The invention claimed is:

1. An assembly for using a keyboard as an operational relay for a mouse or trackball device, comprising:
   a keyboard having a housing, external pushkeys and internal pushkey circuits for each pushkey, said pushkey circuits being connected to a computer by a cable;
   a mouse or trackball device;
   wireless coupling means including a one-way wireless receiving device or a two-way wireless receiving and transmitting device, said wireless coupling means being built-in and situated inside said keyboard housing for wirelessly coupling signals from said mouse or trackball device to a relay lead for transmission to said computer,
   wherein said relay lead extends from said keyboard to said computer,
   wherein at least one infrared sensor is positioned in a notch in a side of said keyboard, and
   further comprising a cover for at least partially blocking said notch to prevent interference.

2. An assembly for using a keyboard as an operational relay for a mouse or trackball device as claimed in claim 1, wherein a number of said sensors is at least two, and said sensors share a common said receiver.

3. An assembly for using a keyboard as an operational relay for a mouse or trackball device as claimed in claim 1, wherein a number of said sensors and said receivers is at least two.

4. An assembly for using a keyboard as an operational relay for a mouse or trackball device as claimed in claim 1, wherein a set of said sensors is situated on at least two sides of said keyboard.

5. An assembly for using a keyboard as an operational relay for a mouse or trackball device as claimed in claim 1, wherein a set of said sensors and a corresponding set of said receivers is situated on at least two sides of said keyboard.

6. An assembly for using a keyboard as an operational relay for a mouse or trackball device as claimed in claim 1, further comprising light guide means for guiding infrared signals from said mouse or trackball to said at least one infrared sensor and controlling an angle over which said infrared signals may be sensed.

7. An assembly for using a keyboard as an operational relay for a mouse or trackball device as claimed in claims 6, wherein said light guide means include reflective materials.

8. An assembly for using a keyboard as an operational relay for a mouse or trackball device as claimed in claim 1, wherein said cover is selected from the group consisting of a snap-on, push-pull, solenoidal suction, and blocking plug type cover.

9. An assembly for using a keyboard as an operational relay for a mouse or trackball device as claimed in claim 1, wherein said coupling means includes a receiver selected from the group consisting of an infrared and an ultrasound receiver, and further comprising a channel extending through said keyboard from an edge of said keyboard to said receiver for guiding infrared or ultrasound signals to said receiver.

10. An assembly for using a keyboard as an operational relay for a mouse or trackball device as claimed in claim 1, wherein said coupling means include at least one sensor for detecting wireless signals transmitted by said mouse or trackball device, and further comprising means for adjusting an azimuth angle of said sensor.

11. An assembly for using a keyboard as an operational relay for a mouse or trackball device as claimed in claim 1, further comprising means including a movable reflective surface for adjusting a horizontal angle over which signals may be transmitted to said one-way wireless receiving device or two-way wireless receiving and transmitting device.

12. An assembly for using a keyboard as an operational relay for a mouse or trackball device as claimed in claim 1, further comprising means including a movable reflective surface for adjusting a vertical angle over which signals may be transmitted to said one-way wireless receiving device or two-way wireless receiving and transmitting device.

13. An assembly for using a keyboard as an operational relay for a mouse or trackball device as claimed in claim 1, further comprising means including a movable spheroidal reflective surface for adjusting horizontal and vertical angles over which signals may be transmitted to said one-way wireless receiving device or two-way wireless receiving and transmitting device.

14. An assembly for using a keyboard as an operational relay for a mouse or trackball device, comprising:
 a keyboard having a housing, external pushkeys and internal pushkey circuits for each pushkey, said keyboard being separated from a computer and said pushkey circuits being connected to a computer by a cable;
 a mouse or trackball device;
 wireless coupling means including a one-way wireless receiving device or a two-way wireless receiving and transmitting device, said wireless coupling means being built-in and situated inside said keyboard housing for wirelessly coupling signals from said mouse or trackball device to a relay lead for transmission to said computer,
 wherein said coupling means includes at least one ultrasound sensor positioned in said keyboard, and at least one receiver for coupling an output of said at least one sensor to said relay lead.

15. An assembly for using a keyboard as an operational relay for a mouse or trackball device as claimed in claim 14, wherein a number of said sensors is at least two, and said sensors share a common said receiver.

16. An assembly for using a keyboard as an operational relay for a mouse or trackball device as claimed in claim 14, wherein a number of said sensors and said receivers is at least two.

17. An assembly for using a keyboard as an operational relay for a mouse or trackball device as claimed in claim 14, wherein a set of said sensors is situated on at least two sides of said keyboard.

18. An assembly for using a keyboard as an operational relay for a mouse or trackball device as claimed in claim 14, wherein a set of said sensors and a corresponding set of said receivers situated on at least two sides of said keyboard.

19. An assembly for using a keyboard as an operational relay for a mouse or trackball device, comprising:
 a keyboard having a housing, external pushkeys and internal pushkey circuits for each pushkey, said keyboard being separated from a computer and said pushkey circuits being connected to a computer by a cable;
 a mouse or trackball device;
 wireless coupling means including a one-way wireless receiving device or a two-way wireless receiving and transmitting device, said wireless coupling means being built-in and situated inside said keyboard housing for wirelessly coupling signals from said mouse or trackball device to a relay lead for transmission to said computer,
 wherein said coupling means includes at least one an ultrasound sensor positioned within said keyboard, and further comprising sound guide means for guiding ultrasound signals from said mouse or trackball to said at least one ultrasound sensor and controlling an angle over which said ultrasound signals may be sensed.

20. An assembly for using a keyboard as an operational relay for a mouse or trackball device as claimed in claim 19, wherein said sound guide means include reflective materials.

21. An assembly for using a keyboard as an operational relay for a mouse or trackball device as claimed in claim 19, wherein said at least one ultrasound sensor is positioned in a notch in a side of said keyboard.

22. An assembly for using a keyboard as an operational relay for a mouse or trackball device as claimed in claim 21, further comprising a cover for at least partially blocking said notch to prevent interference.

23. An assembly for using a keyboard as an operational relay for a mouse or trackball device as claimed in claim 22, wherein said cover is selected from the group consisting of a snap-on, push-pull, solenoidal suction, and blocking plug type cover.

24. An assembly for using a keyboard as an operational relay for a mouse or trackball device, comprising:
 a keyboard having a housing, external pushkeys and internal pushkey circuits for each pushkey, said keyboard being separated from a computer and said pushkey circuits being connected to a computer by a cable;
 a mouse or trackball device;
 wireless coupling means including a one-way wireless receiving device or a two-way wireless receiving and transmitting device, said wireless coupling means being built-in and situated inside said keyboard housing for wirelessly coupling signals from said mouse or trackball device to a relay lead for transmission to said computer,
 wherein said relay lead extends from said keyboard to said computer and said coupling means includes an R.F. receiver positioned in said keyboard and arranged to couple R.F. signals from said mouse or trackball to the receiver installed in said keyboard and then to said computer through said relay lead.

25. An assembly for using a keyboard as an operational relay for a mouse or trackball device as claimed in claim 24, further comprising a mouse pad attached to said keyboard.

26. An assembly for using a keyboard as an operational relay for a mouse or trackball device as claimed in claim 25, wherein said detachable mouse pad includes a plurality of pillars and said keyboard includes a plurality of openings for removably receiving said pillars.

27. An assembly for using a keyboard as an operational relay for a mouse or trackball device as claimed in claim 25, wherein said mouse pad is articulated to said keyboard.

28. An assembly for using a keyboard as an operational relay for a mouse or trackball device as claimed in claim 25, wherein said mouse pad includes means for movably retaining said mouse or trackball.

29. An assembly for using a keyboard as an operational relay for a mouse or trackball device as claimed in claim 24, wherein said relay lead extends parallel to said cable.

30. An assembly for using a keyboard as an operational relay for a mouse or trackball device as claimed in claim 24, wherein said relay lead is situated within said cable.

31. An assembly for using a keyboard as an operational relay for a mouse or trackball device as claimed in claim 24, wherein said relay lead is an electrical lead.

32. An assembly for using a keyboard as an operational relay for a mouse or trackball device as claimed in claim 24, wherein said relay lead is a fiber optic lead.

33. An assembly for using a keyboard as an operational relay for a mouse or trackball device, comprising:
- a keyboard having a housing, external pushkeys and internal pushkey circuits for each pushkey, said keyboard being separated from a computer and said pushkey circuits being connected to a computer by a cable;
- a mouse or trackball device;
- wireless coupling means including a one-way wireless receiving device or a two-way wireless receiving and transmitting device, said wireless coupling means being built-in and situated inside said keyboard housing for wirelessly coupling signals from said mouse or trackball device to a relay lead for transmission to said computer,
- wherein said coupling means include a plurality of sensors selected from the group consisting of infrared and ultrasonic sensors, and further comprising means for switchably connecting said sensors to a single common receiver.

34. An assembly for using a keyboard as an operational relay for a mouse or trackball device, comprising:
- a keyboard having a housing, external pushkeys and internal pushkey circuits for each pushkey, said keyboard being separated from a computer and said pushkey circuits being connected to a computer by a cable;
- a mouse or trackball device;
- wireless coupling means including a one-way wireless receiving device or a two-way wireless receiving and transmitting device, said wireless coupling means being built-in and situated inside said keyboard housing for wirelessly coupling signals from said mouse or trackball device to a relay lead for transmission to said computer,
- wherein said coupling means include a plurality of sensors and corresponding receivers selected from the group consisting of infrared and ultrasonic receivers, and further comprising means for switchably connecting said receivers to said relay lead.

35. An assembly for using a keyboard as an operational relay for a mouse or trackball device, comprising:
- a keyboard having a housing, external pushkeys and internal pushkey circuits for each pushkey, said keyboard being separated from a computer and said pushkey circuits being connected to a computer by a cable;
- a mouse or trackball device;
- wireless coupling means including a one-way wireless receiving device or a two-way wireless receiving and transmitting device, said wireless coupling means being built-in and situated inside said keyboard housing for wirelessly coupling signals from said mouse or trackball device to a relay lead for transmission to said computer, wherein said coupling means include at least one sensor for detecting wireless signals transmitted by said mouse or trackball device, and further comprising means for adjusting a pitch of said sensor.

36. An assembly for using a keyboard as an operational relay for a mouse or trackball device, comprising:
- a keyboard having a housing, external pushkeys and internal pushkey circuits for each pushkey, said keyboard being separated from a computer and said pushkey circuits being connected to a computer by a cable;
- mouse or trackball device;
- wireless coupling means including a one-way wireless receiving device or a two-way wireless receiving and transmitting device, said wireless coupling means being built-in and situated inside said keyboard housing for wirelessly coupling signals from said mouse or trackball device to a relay lead for transmission to said computer, wherein said coupling means include at least one sensor for detecting wireless signals transmitted by said mouse or trackball device, and further comprising means for adjusting vertical and horizontal orientations of said sensor.

37. An assembly for using a keyboard as an operational relay for a mouse or trackball device as claimed in claim 36, wherein said means for adjusting vertical and horizontal orientations of said sensor include a spherical member and a corresponding spheroidal socket.

* * * * *